(12) United States Patent
Tsuboi et al.

(10) Patent No.: US 10,149,228 B2
(45) Date of Patent: Dec. 4, 2018

(54) TERMINAL DEVICE, BASE STATION APPARATUS, COMMUNICATION SYSTEM, CONTROL METHOD, AND INTEGRATED CIRCUIT

(71) Applicant: SHARP KABUSHIKI KAISHA, Sakai, Osaka (JP)

(72) Inventors: Hidekazu Tsuboi, Sakai (JP); Katsunari Uemura, Sakai (JP); Yasuyuki Kato, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 24 days.

(21) Appl. No.: 15/318,562

(22) PCT Filed: Jun. 5, 2015

(86) PCT No.: PCT/JP2015/066356
§ 371 (c)(1),
(2) Date: Dec. 13, 2016

(87) PCT Pub. No.: WO2016/002435
PCT Pub. Date: Jan. 7, 2016

(65) Prior Publication Data
US 2017/0118693 A1   Apr. 27, 2017

(30) Foreign Application Priority Data

Jul. 3, 2014   (JP) .................................. 2014-137379

(51) Int. Cl.
*H04W 48/02*   (2009.01)
*H04W 72/04*   (2009.01)
(Continued)

(52) U.S. Cl.
CPC ........... *H04W 48/02* (2013.01); *H04W 72/04* (2013.01); *H04W 72/042* (2013.01);
(Continued)

(58) Field of Classification Search
CPC ... H04W 48/02; H04W 72/04; H04W 72/042; H04W 72/10; H04W 76/023; H04W 76/14; H04W 88/02; H04W 88/08; H04W 92/18
See application file for complete search history.

(56) References Cited

U.S. PATENT DOCUMENTS 9,451,528 B2 *   9/2016   Isobe .................... H04W 76/14
9,730,092 B2 *   8/2017   Jung .................... H04L 5/0053
(Continued)

FOREIGN PATENT DOCUMENTS

JP   2013-223194 A   10/2013
JP   2014-33385 A    2/2014

OTHER PUBLICATIONS

"3GPP TR 36.843 V12.0.1 (Mar. 2014), 3rd Generation Partnership Project; Technical Specification Group Radio Access Network; Study on LTE Device to Device Proximity services; Radio Aspects (Release 12)", 3GPP Organizational Partners, 2014, pp. 1-50.
(Continued)

*Primary Examiner* — Tri H Phan
(74) *Attorney, Agent, or Firm* — Birch, Stewart, Kolasch & Birch, LLP

(57) ABSTRACT

Provided are a terminal device, a base station apparatus, a communication system, a control method, and an integrated circuit, in all of which it is possible that access control when performing device-to-device communication is efficiently performed. The terminal device selects which one of a device-to-device data communication and a procedure for establishment of a radio resource control connection to the base station apparatus to perform, based on information on whether or not restriction of access to the base station apparatus is in progress, in which the device-to-device data communication uses a transmission resource which is avail-
(Continued)

able when the specific condition that is notified or broadcast by the base station apparatus is satisfied.

8 Claims, 10 Drawing Sheets

(51) Int. Cl.
H04W 76/14 (2018.01)
H04W 92/18 (2009.01)
H04W 76/02 (2009.01)
H04W 88/02 (2009.01)
H04W 88/08 (2009.01)
H04W 72/10 (2009.01)

(52) U.S. Cl.
CPC ......... *H04W 76/023* (2013.01); *H04W 76/14* (2018.02); *H04W 92/18* (2013.01); *H04W 72/10* (2013.01); *H04W 88/02* (2013.01); *H04W 88/08* (2013.01)

(56) References Cited

U.S. PATENT DOCUMENTS

| | | | |
|---|---|---|---|
| 10,028,257 B2* | 7/2018 | Jung | H04W 72/1284 |
| 2014/0314039 A1* | 10/2014 | Jang | H04W 76/023 |
| | | | 370/329 |
| 2015/0119049 A1* | 4/2015 | Isobe | H04W 76/14 |
| | | | 455/445 |
| 2015/0271861 A1* | 9/2015 | Li | H04W 76/14 |
| | | | 455/426.1 |
| 2015/0296443 A1* | 10/2015 | Lim | H04W 48/12 |
| | | | 370/312 |
| 2016/0037323 A1* | 2/2016 | Kim | H04W 76/14 |
| | | | 370/329 |
| 2016/0044727 A1* | 2/2016 | Zisimopoulos | H04W 48/02 |
| | | | 455/41.2 |
| 2016/0302152 A1* | 10/2016 | Morita | H04W 52/0212 |
| 2017/0006644 A1* | 1/2017 | Tsuboi | H04L 69/28 |
| 2017/0079016 A1* | 3/2017 | Nord | H04W 72/00 |
| 2017/0085573 A1* | 3/2017 | Zhang | H04W 76/14 |
| 2017/0222861 A1* | 8/2017 | Jung | H04W 4/70 |

OTHER PUBLICATIONS

Intel Corporation, "RRC connection establishment for the purpose of D2D mode 1 resource allocation", R2-142049, 3GPP TSG-RAN WG2 Meeting #86, Seoul, Republic of Korea, May 2014, 3 pages.

\* cited by examiner

TERMINAL DEVICE, BASE STATION APPARATUS, COMMUNICATION SYSTEM, CONTROL METHOD, AND INTEGRATED CIRCUIT

TECHNICAL FIELD

Embodiments of the present invention relate to a technology associated with a terminal device, a base station apparatus, a communication system, a control method, and an integrated circuit, in all of which access control when performing device-to-device communication is efficiently performed.

BACKGROUND ART

In the 3rd Generation Partnership Project (3GPP) that is a standardization project, a standardization process for Evolved Universal Terrestrial Radio Access (which is hereinafter referred to as EUTRA) that realizes high-speed communication has been performed by employing flexible scheduling in prescribed frequency and time units, which is referred to as an Orthogonal Frequency-Division Multiplexing (OFDM) communication scheme or a resource block.

Furthermore, in the 3GPP, discussions on Advanced EUTRA that realizes higher-speed data transfer and has upper compatibility with EUTRA have taken place.

In Advanced EUTRA, introduction of inter-terminal device (Device to Device (D2D)) communication is considered. In the D2D communication (which is also referred to as device-to-device communication or device-to-device direct-communication), as a service between terminal devices in proximity to each other (Proximity based Service (ProSe)), a mechanism (ProSe Didcovery) for checking (discovering) whether or not the terminal devices are located close to each other, a mechanism (which is also referred to as ProSe Communication, ProSe Direct Communication, Device-to-Device data communication, D2D data communication, inter-device data communication, device-to-device direct-data communication, or the like) in order for the terminal devices to perform communication without involving a base station apparatus, or the like are mainly considered (NPL 1).

CITATION LIST

Non Patent Literature

NPL 1: 3GPP TS 36.843 V12.0.1 (2014-03) http://www.3gpp.org/Dynareport/36843.htm
NPL 2: R2-142049, Intel Corporation, "RRC connection establishment for the purpose of D2D mode 1 resource allocation" http://www.3gpp.org/ftp/tsg_ran/WG2_RL2/TSGR2_86/Docs/R2-142049.zip

SUMMARY OF INVENTION

Technical Problem

In NPL 2, it is disclosed that when making a connection to the base station apparatus, the base station apparatus can allocate a suitable radio resource to the terminal device by identifying whether the connection to the base station apparatus is a connection for communication (device-to-network (D2N) communication) with the base station apparatus or a connection for making a request to the base station apparatus for a radio resource for inter-terminal device communication (the device-to-device (D2D) communication).

However, in NPL 2, a specific method for processing that makes a request to the base station apparatus for the radio resource for the inter-terminal device in a case where access restriction is performed in communication with the base station apparatus in a current state is not disclosed.

Furthermore, when the same access restriction is performed on the connection for the request for the radio resource for the inter-terminal device communication and the connection for the communication with the base station apparatus, in a case where a congestion place, because of which the access restriction is performed, is not a wireless section, because even the request for the radio resource for the inter-terminal device communication on which congestion has no influence is restricted, this is inefficient.

Furthermore, when the terminal device that is subject to the access restriction or the terminal device of which an RRC connection request is rejected performs the communication based on radio resource information for the inter-terminal device communication, which is broadcast from the base station apparatus, there is a problem in that the number of times that access to the radio resource takes place increases and thus congestion takes place.

An object of embodiments of the present invention, which were contrived in view of the problems described above, is to deal with at least one of the problems described above by providing a technology associated with a terminal device, a base station apparatus, a communication system, a control method, and an integrated circuit, in all of which it is possible to efficiently perform access control when performing device-to-device communication.

Solution to Problem

In order to accomplish the object described above, the following means are contrived. That is, according to an embodiment of the present invention, there is provided a terminal device that performs data communication with a base station apparatus and device-to-device data communication that is inter-terminal device direct-data communication using a radio resource which is configured by the base station apparatus, the terminal device selecting any one of a device-to-device data communication that uses a transmission resource which is available when a specific condition that is notified or broadcast by the base station apparatus is satisfied, and a procedure for establishment of a radio resource control connection, based on information on whether or not restriction of access to the base station apparatus is in progress.

Furthermore, according to another embodiment of the present invention, there is provided a base station apparatus that allocates a transmission resource for device-to-device data communication that is inter-terminal device direct-data communication, to a terminal device, the base station apparatus notifying or broadcasting a transmission resource that is available when a specific condition is satisfied, to the terminal device, and causing the terminal device, which performs access restriction, to perform the device-to-device data communication that uses the transmission resource.

Furthermore, according to still another embodiment of the present invention, there is provided a communication system including: a terminal device that performs device-to-device data communication which is inter-terminal device direct-data communication, using a radio resource that is configured by a base station apparatus; and the base station apparatus that allocates a transmission resource for the device-to-device data communication to the terminal device, in which the base station apparatus notifies or broadcasts a transmission resource that is available when a specific condition is satisfied, to the terminal device, in which the terminal device selects which one of a device-to-device data communication and a procedure for establishment of a radio resource control connection to the base station apparatus to perform, based on information on whether or not restriction of access to the base station apparatus is in progress, and in which the device-to-device data communication uses a transmission resource which is available when the specific condition that is notified or broadcast by the base station apparatus is satisfied.

Furthermore, according to still another embodiment of the present invention, there is provided a notification method that is a control method which is applied to a terminal device which performs device-to-device data communication that is inter-terminal device direct-data communication using a radio resource which is configured by a base station apparatus, the method comprising at least: a step of selecting which one of a device-to-device data communication and a procedure for establishment of a radio resource control connection to the base station apparatus to perform, based on information on whether or not restriction of access to the base station apparatus is in progress, in which the device-to-device data communication uses a transmission resource which is available when the specific condition that is notified or broadcast by the base station apparatus is satisfied.

Furthermore, according to still another embodiment of the present invention, there is provided an integrated circuit that is built into a terminal device which performs device-to-device data communication that is inter-terminal device direct-data communication using a radio resource which is configured by a base station apparatus, the integrated circuit causing the terminal device to perform: a function of selecting which one of a device-to-device data communication and a procedure for establishment of a radio resource control connection to the base station apparatus to perform, based on information on whether or not restriction of access to the base station apparatus is in progress, in which the device-to-device data communication uses a transmission resource which is available when the specific condition that is notified or broadcast by the base station apparatus is satisfied.

Advantageous Effects of Invention

As described above, according to embodiments of the present invention, a technology associated with a terminal device, a base station apparatus, a communication system, a control method, and an integrated circuit, in all of which it is possible that access control when performing device-to-device communication is efficiently performed, can be provided.

DESCRIPTION OF EMBODIMENTS

Figure 1:
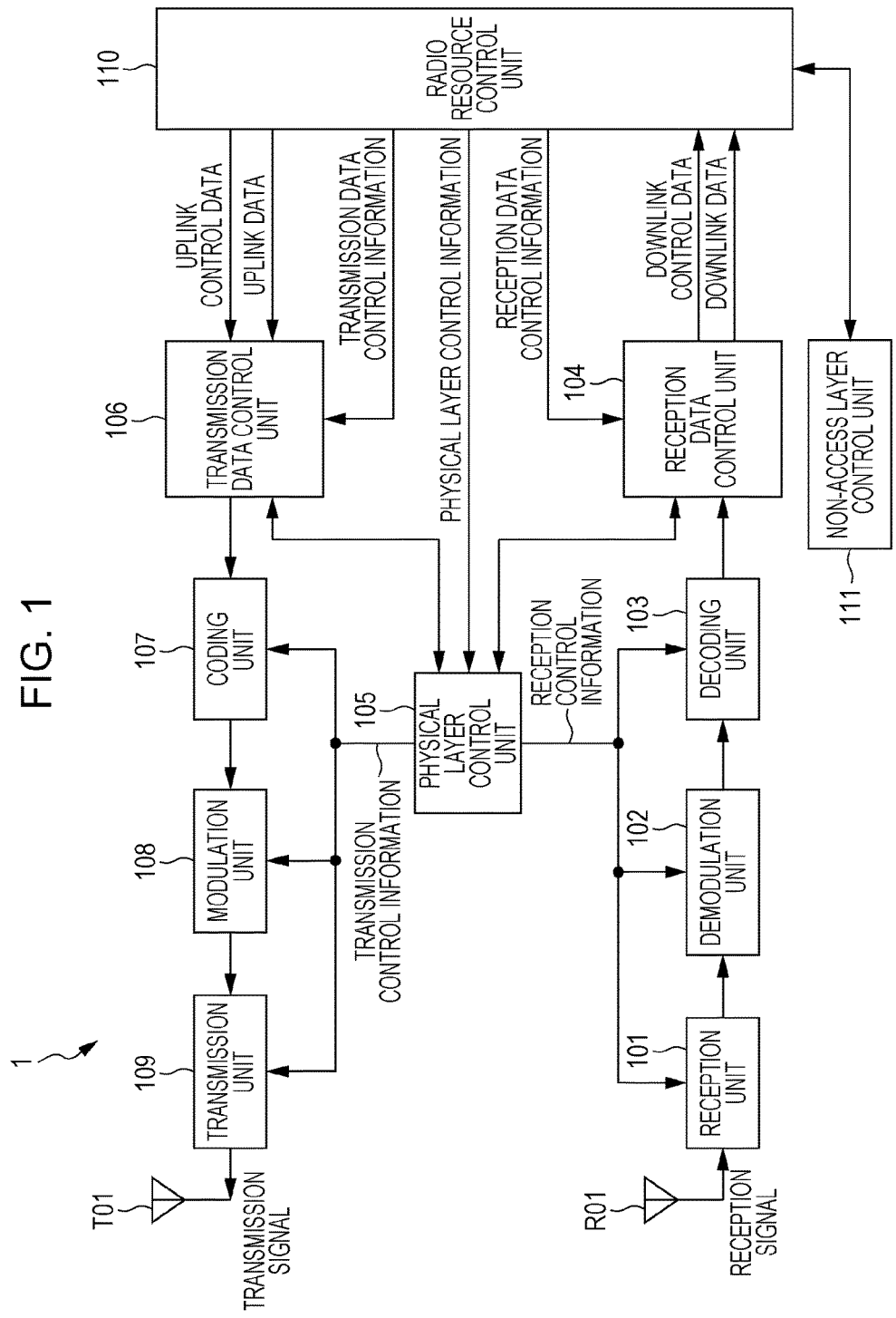
FIG. 1 is a block diagram illustrating an example of a schematic constitution of a terminal device according to an embodiment of the present invention.

A technology associated with each embodiment of the present invention will be described briefly below.

[Physical Channel/Physical Signal]

Main physical channels and physical signals that are used in EUTRA and Advanced EUTRA are described. A channel means a medium that is used for signal transmission and reception, and a physical channel means a physical medium that is used for the signal transmission and reception. According to the present invention, the physical channel and the signal can be used synonymously. There is a likelihood that in EUTRA and Advanced EUTRA, the physical channel will be added in future or an architecture or format type thereof will be changed or added, but this change or addition does not have any influence on a description of each embodiment of the present invention.

In EUTRA and Advanced EUTRA, scheduling of the physical channel or the physical signal is managed using a radio frame. One radio frame is 10 ms, and one radio frame is constituted from 10 subframes. In addition, one subframe is constituted from two slots (that is, one subframe is 1 ms and one slot is 0.5 ms). Furthermore, management is performed using a resource block as a minimum unit for scheduling for allocating the physical channel. The resource block is stipulated with a fixed frequency domain that is constituted from a set of multiple subcarriers (for example, 12 subcarriers) along a frequency axis and by a domain that is constituted from a fixed transmission time interval (one slot).

A Synchronization Signal is constituted from 3 types of primary synchronization signals and a secondary synchronization signal that is constituted from 31 types of codes which are interleaved in the frequency domain. With a combination of these signals, the primary synchronization signal and the secondary synchronization signal, 504 cell identifiers (physical cell IDs (Physical Cell Identities (PCIs))) for identifying a base station apparatus and a frame timing for wireless synchronization are indicated. A terminal device specifies a physical cell ID of the synchronization signal that is received through cell search.

A Physical Broadcast CHannel (PBCH) is transmitted for the purpose of notifying (configuring) a control parameter (broadcast information (System Information (SI))) that is used in a shared manner in terminal devices within a cell. When it comes to the broadcast information that is not notified on the Physical Broadcast Channel, a radio resource with which the broadcast information is transmitted on a Physical Downlink Control Channel is notified to the terminal device within the cell, and with the notified radio resource, a layer 3 message (system information) that notifies the broadcast information using a Physical Downlink Shared Channel is transmitted.

As pieces of broadcast information, a Cell Global Identifier (CGI) indicating a cell-dedicated identifier, a Tracking Area Identifier (TAI) for managing a waiting area by paging, random access configuration information, transmission timing adjustment information, shared radio resource configuration information in the cell, neighboring cell information, uplink access limitation information, and the like are notified.

Downlink reference signals are categorized by their usage into multiple types. For example, a cell-specific RS (Cell-specific Reference Signals (CRS)) is a pilot signal that is transmitted with a prescribed power for every cell, and is a downlink reference signal that is periodically iterated in the frequency domain and the time domain based on a prescribed rule. The terminal device measures reception quality for every cell by receiving the cell-specific RS. Furthermore, the terminal device uses a downlink cell-specific RS also as a reference signal for demodulation of the Physical Downlink Control Channel that is transmitted at the same time as the cell-specific RS, or of the Physical Downlink Shared Channel. As a sequence that is used for the cell-specific RS, a sequence that is identifiable for every cell is used.

Furthermore, the downlink reference signal is also used for estimation of propagation fluctuation in the downlink. The downlink reference signal that is used for the estimation of the propagation fluctuation is referred to as a Channel State Information Reference Signals (CSI-RS). Furthermore, the downlink reference signal that is configured, in a dedicated manner, for the terminal device is referred to as UE-specific Reference Signals (URS) or Dedicated RS (DRS), and is referred to for channel compensation processing of the channel that is to be performed when demodulating the Physical Downlink Control Channel or the Physical Downlink Shared Channel.

A Physical Downlink Control Channel (PDCCH) is transmitted in several OFDM symbols (for example, 1 to 4 OFDM symbols) starting from the head of each subframe. An Enhanced Physical Downlink Control Channel (EPDCCH) is a Physical Downlink Control Channel that is allocated to the OFDM symbols to which the Physical Downlink Shared Channel (PDSCH) is allocated. The PDCCH or the EPDCCH is used for the purpose of notifying radio resource allocation information in accordance with the scheduling of the terminal device by the base station apparatus, or information indicating an amount of adjustment for an increase or decrease in transmit power. Unless otherwise specified, the Physical Downlink Control Channel (PDCCH) that will be described simply below means both of the physical channels, the PDCCH and the EPDCCH.

The terminal device monitors the Physical Downlink Control Channel that is destined for the terminal device itself before transmitting and receiving a Layer 2 message and the Layer 3 message (paging, a handover command, or the like) that are downlink data or downlink control data, and receives the Physical Downlink Control Channel that is destined for the terminal device itself. Thus, the terminal device needs to acquire from the Physical Downlink Control Channel the radio resource allocation information that is referred to as an uplink grant at the time of the transmission and as a downlink grant (a downlink assignment) at the time of the reception. Moreover, it is also possible that, in addition to being transmitted in the OFDM symbol described above, the Physical Downlink Control Channel is constituted to be transmitted in a region of a resource block that is allocated in a dedicated manner from the base station apparatus to the terminal device.

A Physical Uplink Control CHannel (PUCCH) is used for an acknowledgement response (ACKnowledgement/Negative ACKnowledgement (ACK/NACK)) for reception of data that is transmitted on the Physical Downlink Shared Channel, for downlink channel (channel state) information (Channel State Information (CSI)), or for making an uplink radio resource allocation request (a radio resource request or a Scheduling Request (SR)).

Pieces of CSI include a Channel Quality Indicator (CQI), a Precoding Matrix Indicator (PMI), a Precoding Type Indicator (PTI), and a Rank Indicator (RI). Each indicator may be expressed as indication.

The Physical Downlink Shared Channel (PDSCH) is also used for notifying the terminal device of the broadcast information (the system information) that is not notified by the paging or on the physical broadcast channel, as the layer 3 message, in addition to the downlink data. The radio resource allocation information of the Physical Downlink Shared Channel is indicated with the Physical Downlink Control Channel. The Physical Downlink Shared Channel is transmitted in a state of being allocated to OFDM symbols other than the OFDM symbols in which the Physical Downlink Control Channel is transmitted. That is, the Physical Downlink Shared Channel and the Physical Downlink Control Channel are time-multiplexed within one subframe.

It is possible that uplink data and uplink control data are mainly transmitted on a Physical Uplink Shared Channel (PUSCH), and that the PUSCH includes control data, such as the received quality of the downlink or the ACK/NACK. Furthermore, the Physical Uplink Shared Channel (PUSCH) is also used for the terminal device to notify the base station apparatus of uplink control information as the layer 3 message, in addition to the uplink data. Furthermore, as is the case in the downlink, the radio resource allocation information of the Physical Uplink Shared Channel is indicated with the Physical Downlink Control Channel.

Included in an Uplink Reference Signal (which is also referred to as an uplink reference signal, a pilot signal, or an uplink pilot channel) are a Demodulation Reference Signal (DMRS) that is used for the base station apparatus to demodulate the Physical Uplink Control Channel (PUCCH) and/or the Physical Uplink Shared Channel (PUSCH) and a Sounding Reference Signal (SRS) that is used for the base station apparatus to mainly estimate an uplink channel state. Furthermore, as the Sounding Reference Signals, there are a periodic Sounding Reference Signal (Periodic SRS) that is periodically transmitted and an aperiodic Sounding Reference Signal (Aperiodic SRS) that is transmitted when there is an instruction to transmit the Aperiodic SRS from the base station apparatus.

A Physical Random Access Channel (PRACH) is a channel that is used for notifying (configuring) a preamble sequence, and has a guard time. The preamble sequence is constituted in such a manner that information is notified to the base station apparatus with multiple sequences. For example, in a case where 64 types of sequences are prepared, 6-bit information can be indicated to the base station apparatus. The Physical Random Access Channel is used as means by which the terminal device has access to the base station apparatus.

The terminal device uses the Physical Random Access Channel in order to make an uplink radio resource request when the Physical Uplink Control Channel is not configured, to make a request to the base station apparatus for the transmission timing adjustment information (which is also referred to as timing advance (TA)) indispensable for adjusting an uplink transmission timing to a reception timing window of the base station apparatus, or so on. Furthermore, the base station apparatus can also make a request to the terminal device for starting of a random access procedure using the Physical Downlink Control Channel.

In addition, there is a D2D synchronization signal (D2DSS) that a device which is a synchronization source transmits in order to be synchronized for D2D communication. In a case where the base station apparatus is the synchronization source, the primary synchronization signal and the secondary synchronization signal are used as the D2DSS. In a case where the synchronization source is other than the base station apparatus, a primary D2D synchronization signal (PD2DSS) that is a Zadoff-Chu sequence and a secondary D2D synchronization signal (SD2DSS) that is an M sequence are used as the D2DSS. Furthermore, a physical D2D synchronization channel (PD2DSCH) on which an identifier of a synchronization source apparatus, a type of synchronization source apparatus, a control signal, and the like are notified is considered.

Moreover, detailed descriptions of physical channels or physical signals other than these are omitted because they have no relationship with each embodiment of the present invention. As Physical Channels or physical signals of which the descriptions are omitted, there are a Physical Control Format Indicator CHannel (PCFICH), a Physical Hybrid ARQ Indicator CHannel (PHICH), a Physical Multicast CHannel (PMCH) and the like.

[Wireless Network]

A range (a communication area) in which each frequency is available for communication, which is controlled by the base station apparatus, is regarded as a cell. At this time, the communication area that is covered by the base station apparatus may vary in size and shape from one frequency to another. Furthermore, the area that is covered may vary from one frequency to another. Furthermore, when cells that are covered by different types of base station apparatuses or that have different radii are present in a mixed manner in an area where the same frequency or different frequencies are available and one communication system is formed, this wireless network is referred to as a heterogeneous network.

The terminal device regards the inside of the cell as the communication area, and as such operates. When the terminal device moves from a certain cell to a different cell, the terminal device moves to a separate suitable cell using a cell re-selection procedure at the time of a non-wireless connection (which is also referred to as an idle state or an RRC_IDLE state) and using a handover procedure at the time of a wireless connection (which is also referred to as a connected state or RRC_CONNECTED state). The suitable cell indicates a cell in which it is determined that, generally, the access by the terminal device is not precluded based on information that is designated from the base station apparatus, and in which the reception quality of the downlink satisfies a prescribed condition.

The base station apparatus manages a certain cell that is an area where it is possible that the terminal device performs communication, from one frequency to another. One base station apparatus may manage multiple cells.

When it is possible that the terminal device communicates with a certain base station apparatus, among cells that are covered by the certain base station apparatus, a cell that is configured in such a manner that the cell is used for communication with the terminal device is referred to as a Serving Cell, the other cells that are not used for the communication are referred to as neighboring cells.

[Structure of a Wireless Protocol]

Figure 6:
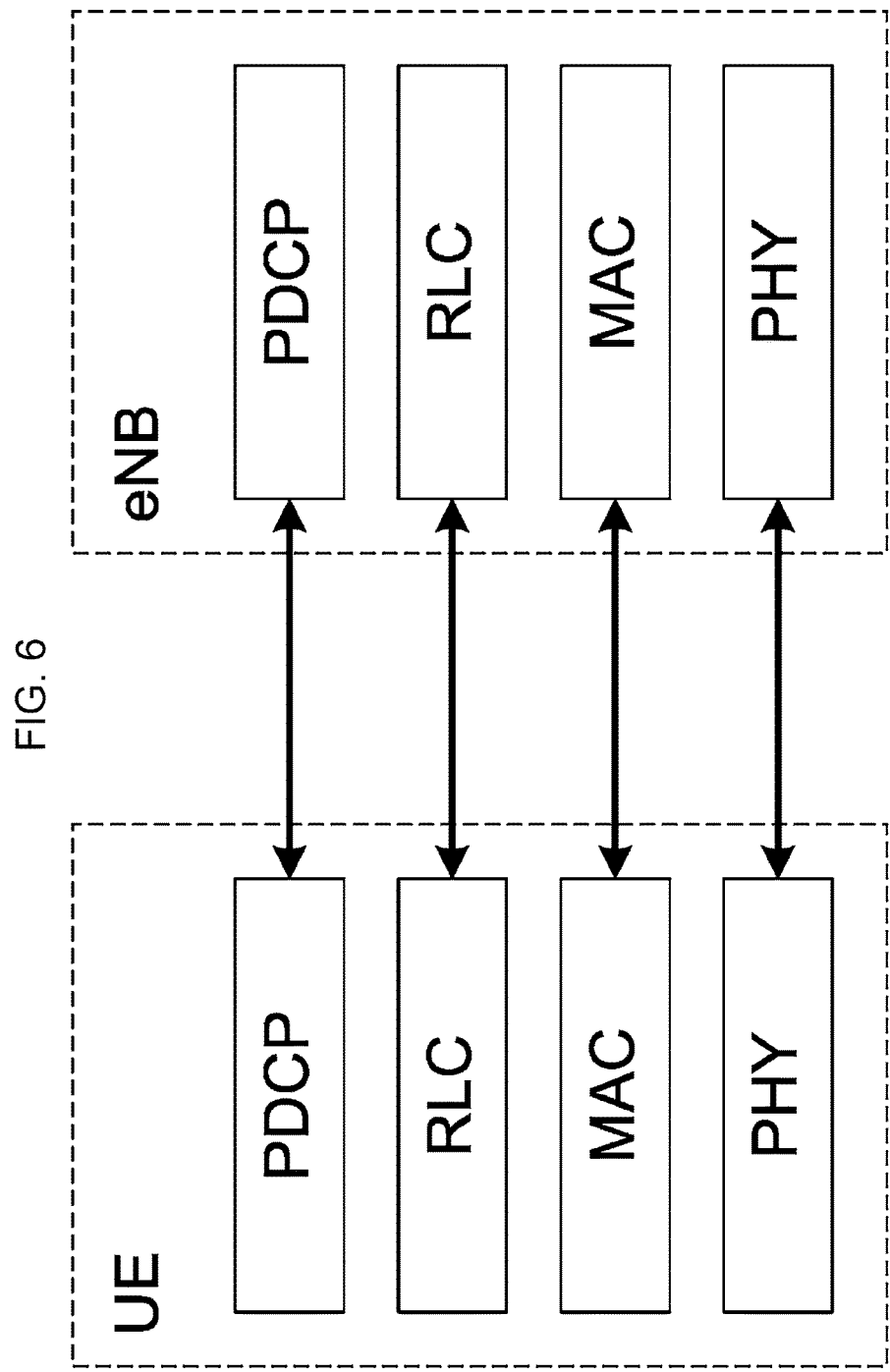
FIG. 6 is a diagram illustrating a user-plane (U-Plane (UP)) protocol stack according to the embodiment of the present invention.

FIG. 6 is a diagram illustrating a user-plane (U-Plane) (UP) protocol stack that handles pieces of user data of the terminal device and the base station apparatus on an EUTRA wireless network (EUTRAN). Furthermore, FIG. 7 is a diagram illustrating a control-plane (C-Plane) (CP) protocol stack that handles control data.

Figure 7:
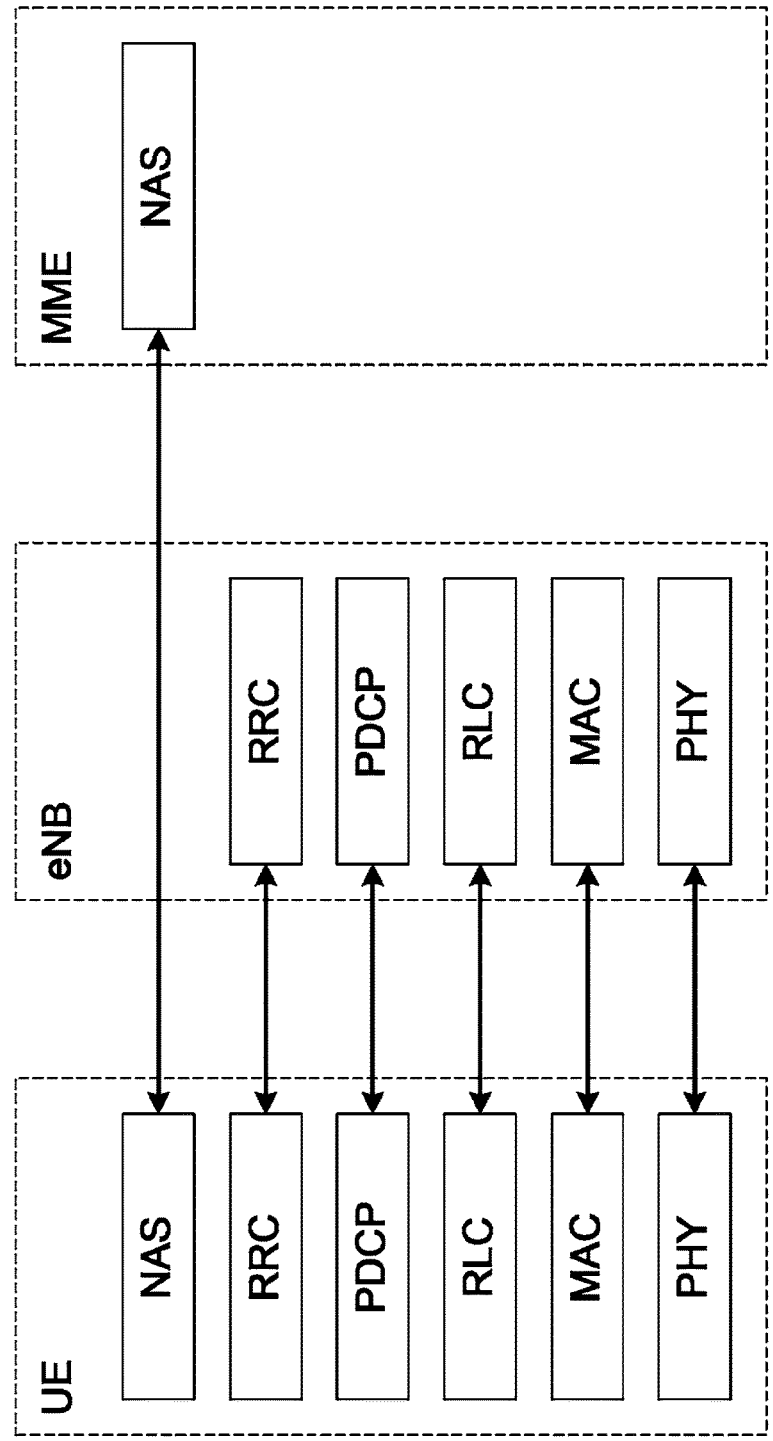
FIG. 7 is a diagram illustrating a control-plane (C-Plane (CP)) protocol stack according to the embodiment of the present invention.

In FIGS. 6 and 7, a physical layer (PHY layer) provides a transfer service to a higher layer using a Physical Channel. The PHY layer is connected to a higher-level Medium Access Control layer (MAC layer) with a transport channel. Through the transport channel, data moves between layers, the MAC layer and the PHY layer. Between the PHY layers of the terminal device and the base station apparatus, data transmission and reception are performed through the physical channel.

The MAC layer performs mapping of various logical channels on various transport channels. The MAC layer is connected to a higher-level Radio Link Control layer (RLC layer) with a logical channel. The logical channel is broadly divided by a type of information that is transferred, and is divided into a control channel on which the control information is transferred and a traffic channel on which the user information is transferred. In order to perform discontinuous reception and transmission (DRX or DTX), the MAC layer has a function of performing control of the PHY layer, a function of executing the random access procedure, a function of notifying information on the transmit power, a function of performing HARQ control, and the like.

The RLC layer performs segmentation and concatenation of data that is received from the higher layer, and adjusts a data size in such a manner that a lower layer can suitably perform data transmission. Furthermore, the RLC layer has a function for guaranteeing Quality of Service (QoS) that is requested by each piece of data. That is, the RLC layer has a function, such as data re-transmission control.

In order to efficiently transfer in a wireless section an IP packet that is the user data, a Packet Data Convergence Protocol layer (PDCP layer) has a header compression function of performing compression of unnecessary control information. Furthermore, the PDCP layer also has a data coding function.

In addition, as the control-plane protocol stack, there is a Radio Resource Control layer (RRC layer). The RRC layer performs configuration or reconfiguration of a Radio Bearer (RB), and performs control of the logical channel, the transport channel, and the physical channel. The RB is divided into a Signaling Radio Bearer (SRB) and a Data Radio Bearer (DRB), and the SRB is used as a path along which an RRC message that is the control information is transmitted. The DRB is used as a path along which the user data is transmitted. Configuration of each RB is performed between the RRC layers of the base station apparatus and the terminal device.

The PHY layer corresponds to a physical layer that is the first layer in a hierarchical structure of the Open Systems Interconnection (OSI) model, the MAC layer, and the RLC layer and the PDCP layer correspond to a data link layer that is the second layer of the OSI model, and the RRC layer corresponds to a network layer that is the third layer of the OSI model.

Furthermore, a signaling protocol that is used between the network and the terminal device is divided into an Access Stratum (AS) protocol and a Non-Access Stratum (NAS) protocol. For example, a protocol of a layer that is the RRC layer or below the RRC layer is the access stratum protocol that is used between the terminal device and the base station apparatus. Furthermore, protocols, such as Connection Management (CM) and Mobility Management (MM) of the terminal device, are the Non-Access Stratum protocols, and are used between the terminal device and a core network (CN). For example, as illustrated in FIG. 7, communication that uses the Non-Access Stratum protocol is performed transparently, through the base station apparatus, between the terminal device and a Mobility Management Entity (MME).

[Random Access Procedure]

The random access procedure will be described below. As the random access procedures, there are two access procedures, a contention based random access procedure and a non-contention based random access procedure.

The contention based Random Access procedure is a random access procedure in which there is a likelihood that contention will take place between mobile station apparatuses, and is performed at a Scheduling Request, such as the time from a state where a connection (communication with) to the base station apparatus is not made to when initial access takes place or a case where the connection to the base station apparatus is made, but uplink data transmission takes place to the mobile station apparatus in a state where uplink synchronization is no longer maintained.

The non-contention based random access procedure is a random access procedure in which the contention does not take place between the mobile station apparatuses. In order to quickly achieve the uplink synchronization between the mobile station apparatus and the base station apparatus in a case where a connection is made between the base station apparatus and the mobile station apparatus but the uplink synchronization is no longer maintained, in a special case such as a case where the handover or the transmission timing for the mobile station apparatus is not enabled, the mobile station apparatus starts the random access procedure when is instructed by the base station apparatus to do so. An instruction to execute the non-contention based random access procedure is provided using a Radio Resource Control (RRC) (Layer 3) layer message and control data on the Physical Downlink Control Channel (PDCCH).

Figure 8:
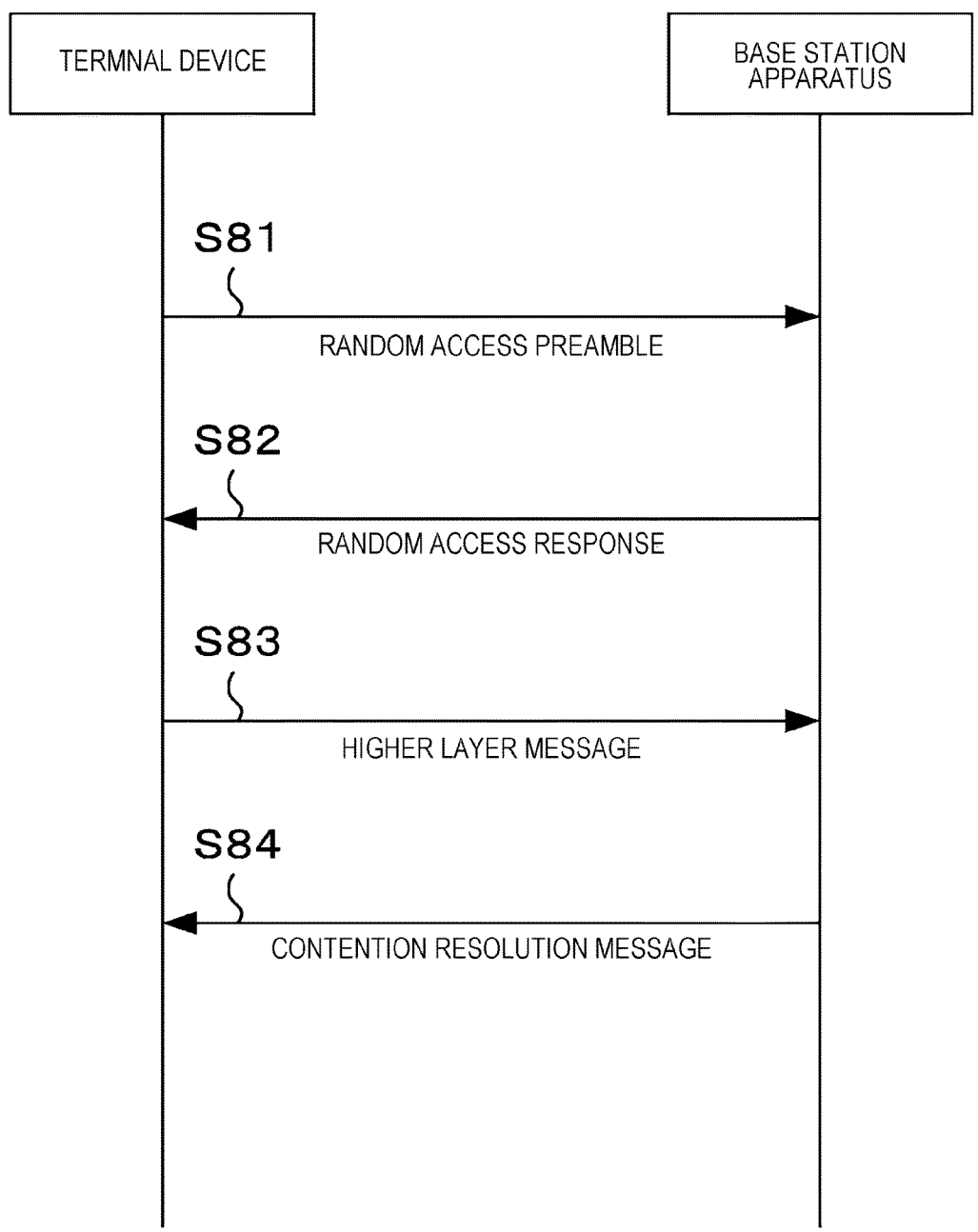
FIG. 8 is a diagram illustrating an example of a sequence chart relating to a contention-based random access procedure according to the embodiment of the present invention.

The contention based random access procedure is described briefly referring to FIG. 8. First, the terminal device transmits a random access preamble to the base station apparatus (message 1: (1) in Step S81). Then, the base station apparatus that receives the random access preamble transmits a response (a random access response) to the random access preamble to the terminal device (message 2: (2) in Step S82). The terminal device transmits a higher layer (Layer 2/Layer 3) message, based on scheduling information that is included in the random access response (message 3: (3) in Step S83). The base station apparatus transmits a contention resolution message to the terminal device that receives the higher layer message of (3) (message 4: (4) in Step S84). Moreover, the contention-based random access is also referred to as random preamble transmission.

Figure 9:
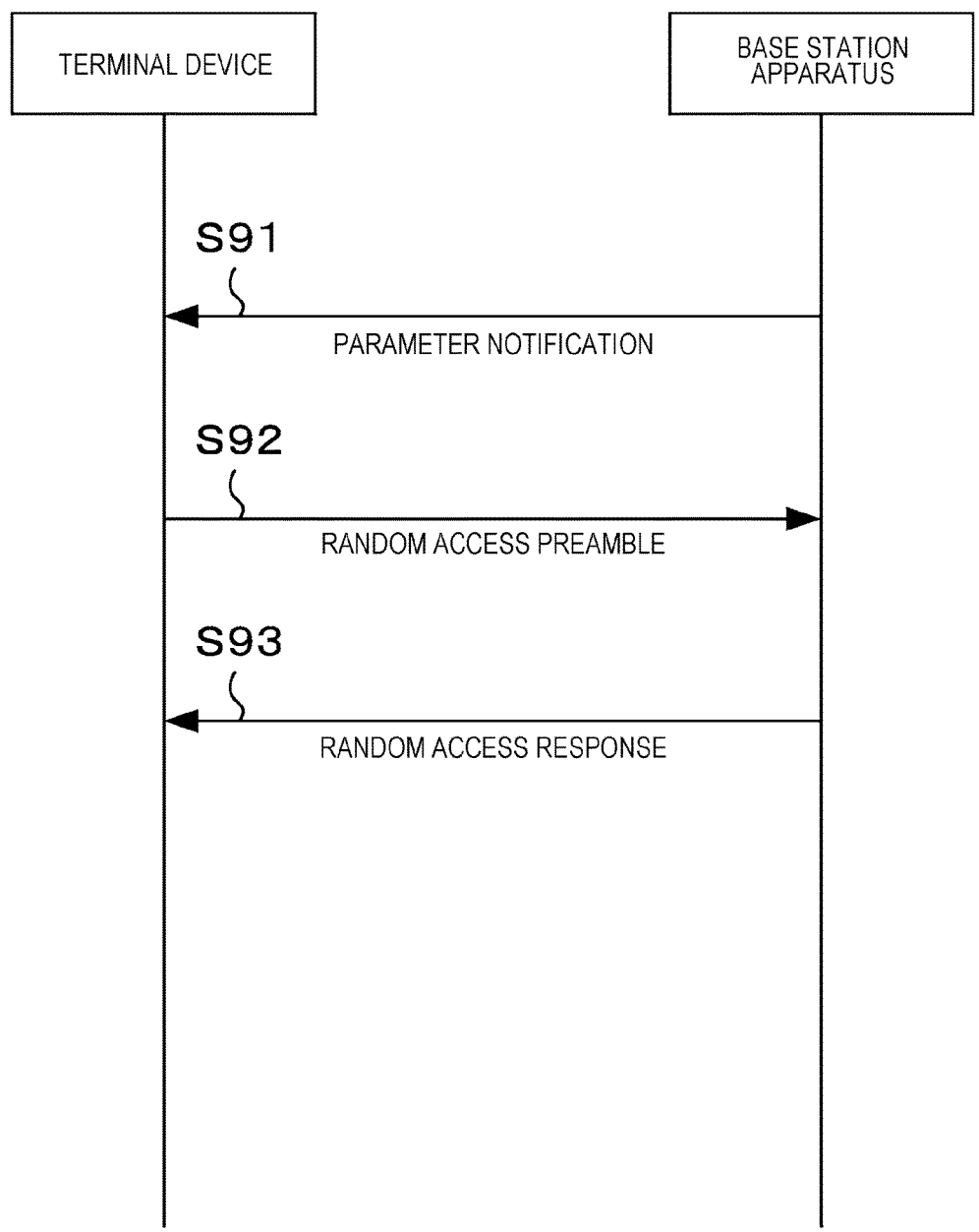
FIG. 9 is a diagram illustrating an example of a sequence chart relating to a non-contention based random access procedure according to the embodiment of the present invention.

Next, the non-contention based random access procedure is described briefly referring to FIG. 9. First, the base station apparatus notifies the terminal device of a preamble number (or a sequence number) and a random access channel number to be used (message 0: (1)' in Step S91). The terminal device transmits the random access preamble of the designated preamble number to a designated Random Access Channel (RACH) (message 1: (2)' in Step S92). Then, the base station apparatus that receives the random access preamble transmits the response (the random access response) to the random access preamble to the terminal device (message 2: (3)' in Step S93). However, in a case where a value of the notified preamble number is 0, the contention based random access procedure is executed. Moreover, the non-contention based random access procedure is also referred to as dedicated preamble transmission.

[Uplink Data Transmission]

Uplink data transmission will be described below. The Physical Uplink Control Channel (PUCCH) is used for a response (an ACK/NACK of) to the downlink data that is transmitted on the Physical Downlink Shared Channel (PDSCH) and for transmission of wireless channel quality information (a Channel Quality Indicator (CQI)) of the downlink and a transmission request (Scheduling Request (SR)) for the uplink data. In a case where the terminal device makes the transmission request for the uplink data, the terminal device transmits the Scheduling Request to the base station apparatus using the Physical Uplink Control Channel (PUCCH) that is allocated by the base station apparatus.

After the transmission of the Scheduling Request, in a case where the base station apparatus allocates a resource for the Physical Uplink Shared Channel (PUSCH), the terminal device transmits a Buffer Status Report (BSR) indicating a buffer status information of data that is transmitted, on the allocated resource for the Physical Uplink Shared Channel (PUSCH), by the terminal device. Moreover, the base station apparatus performs uplink data scheduling on the terminal device based on the Buffer Status Report.

After the transmission of the Scheduling Request, in a case where the base station apparatus does not allocate the resource for the Physical Uplink Shared Channel (PUSCH), the terminal device again transmits the Scheduling Request. Although the retransmission of the Scheduling Request is iterated, in a case where the base station apparatus does not allocate the resource for the Physical Uplink Shared Channel (PUSCH), the terminal device releases the Physical Uplink Control Channel (PUCCH) that is allocated and the Uplink Reference Signal, and executes the random access procedure that is intended for the Scheduling Request. Moreover, in the Scheduling Request using the random access procedure, the terminal device transmits the Buffer Status Report with message 3.

[Details of a Function of the MAC Layer]

A function of the MAC layer of the terminal device will be described in more detail below. The MAC layer has a function of mapping each logical channel to the transport channel. Furthermore, the MAC layer has a function of generating transmission data from the logical channel according to a priority level. This procedure is referred to as a Logical Channel Prioritization (LCP) procedure. In the basic LCP procedure, a transmission priority level of the transmission data is determined considering a priority level of each Logical Channel and a Prioritized Bit Rate (PBR) that has to be transmitted within a fixed period, which corresponds to QoS of the radio bearer, and the transmission data is generated starting from data with the highest priority level at the point in time when the uplink grant is received.

When making a connection to the base station apparatus, the MAC layer acquires pieces of information, such as a logical channel number of each RB, the priority level of the logical channel, and the PBR, from the RRC layer.

Furthermore, the MAC layer has a function of notifying an amount of data (transmission buffer situation) in a transmission buffer that corresponds to each logical channel. This function is referred to as the Buffer Status Report (BSR). Furthermore, the Buffer Status Report is also referred to as an amount-of-transmission-buffer report. With the BSR, each logical channel is allocated to a Logical Channel Group (LCG), and an amount of transmission buffer (a buffer status) for each LCG is notified, as a MAC layer message (MAC CE), to the base station apparatus.

[D2D Communication]

A mechanism (ProSe Didcovery), as a service between the terminal devices in proximity to each other (Proximity based Service (ProSe)), for checking (discovering) even during the D2D communication (device-to-device communication) whether or not the terminal devices are located close to each other, and a mechanism (ProSe Communication) for the terminal device to perform communication without involving the base station apparatus are mainly considered.

Even in a state (RRC_CONNECTED state) in which wireless connection to the base station apparatus is established, and even in a state (RRC_IDLE state) in which the wireless connection to the base station apparatus is not established, transmission of a ProSe Discovery message has to be performed.

Furthermore, even in a case where a signal or a message is transmitted between the terminal devices, the transmission by the terminal device may be under the control of a network. That is, although the terminal device is in a non-wireless connection state, the network may be able to control a radio resource or a parameter for transmitting a ProSe Discovery signal or message, or a state (a wireless connection state or a non-wireless connection state) at the time of the transmission.

In the ProSe Communication (the device-to-device data communication), in a case where the communication is performed with group casting or broadcasting, a step of discovering a communication partner with ProSe Discovery is not necessarily indispensable.

Various ProSe Communication signals are considered, and a physical channel that has the same structure as EUTRA and the PUSCH may be used.

Furthermore, in the ProSe Communication, a resource for receiving scheduling assignments (SA) is provided, as a resource that is to be used by the terminal device, to the terminal device. The terminal device determines the presence or absence of data that is destined for the terminal device itself, by receiving the SA in resources (the time and the frequency) that are designated as a resource pool. The resource pool may be configured in advance, be notified (broadcast) by the base station apparatus, and be notified (broadcast) by a different station apparatus.

In addition, as a method for the terminal device to transmit the above-described SA, a method in which the terminal device makes the transmission request to the base station apparatus, and in response to this, a transmission resource is allocated (which is hereinafter also referred to as Mode 1 or a scheduled type), or a method in which the terminal uses as the transmission resource the broadcast information or a resource that is configured in advance (which is hereinafter also referred to Mode 2 or an autonomous type) may be used. The terminal device that is permitted to use the device-to-device data communication may perform the Mode 2 data communication in an idle state, in a case where the terminal device is permitted, by the base station apparatus that supports the device-to-device data communication, to use Mode 2 data communication, and may make a connection to the base station apparatus in order to perform the Mode 1 data communication, in a case where terminal device is not permitted to use the Mode 2 data communication. Furthermore, in a case where the base station apparatus does not support the device-to-device data communication, the terminal device may make a cell reselection of the base station apparatus that, if the terminal device is in the idle state, supports the device-to-device data communication, and if the terminal device is in the connected state, the terminal device may notify the base station apparatus of information (an identifier of or a frequency information on a desired service, or the like) indicating a desire for the device-to-device data communication. Alternatively, the base station apparatus that has difficulty in recognizing the information indicating the desire for the device-to-device data communication may be instead notified of information indicating a desire for a multicasting or broadcasting service.

In the ProSe Communication, in a case where one-to-M (M is a natural number) broadcasting communication is used, other multiple terminal devices can receive a signal that is transmitted by a certain terminal device, and it is also possible that the terminal device which performs the transmission and the terminal device which performs the reception exchanges their roles. Furthermore, in the case of the public safety purpose, the broadcasting communication needs to be performed even outside of an area covered by the base station apparatus. Furthermore, the broadcasting communication supports both of a dedicated frequency (Dedicated carrier) and a frequency that is used for a normal communication service in which the base station apparatus is involved. Furthermore, because the broadcasting communication is one-way communication, feedback with Layer 2 (the MAC/RLC/PDCP layer) is not assumed. That is, the communication is performed in a Unacknowledge Mode (UM) in which error correction using ARQ is not performed in the RLC layer, without performing retransmission control using a HARQ in the MAC layer. In the case of one-to-one communication, it is also considered that the above-described one-to-M broadcasting communication is applied (M=1), and it is also considered that the feedback with Layer 2 is performed by performing unicasting communication.

Furthermore, as a parameter for performing the device-to-device data communication, SA pool type information (Mode 1 or Mode 2 or common), SA duration information (allocation periodicity of an SA transmission resource), subframe information that is used for the Mode 2 data transmission, physical resource block position information (a starting position or an ending position) in an SA resource pool, or the like is notified (or broadcast) by the base station apparatus (and a terminal device that transfers information to a terminal device outside of an area covered by the base station apparatus) to the terminal device.

Furthermore, a ProSe Communication Traffic Channel (PTCH) is defined as the logical channel for performing the device-to-device data communication, and a ProSe Communication Shared Channel (PSCH) is defined as the transport channel for performing the device-to-device data communication. In the device-to-device data communication, the PTCH as the logical channel is mapped to the PSCH as the transport channel.

Parameters of the MAC layer for the device-to-device data communication, an identifier (a Source Layer 2 ID) of a transmission source and an identifier (a Destination Layer 2 ID) of a transmission destination are configured. Based on the two identifiers and an identifier of the logical channel, a pair of entities of the PDCP layer and the RLC layer is established for every combination. The MAC layer may multiplex multiple MAC SDUs that have the same identifier of the transmission source and the same identifier of the transmission destination, into one MAC PDU. Furthermore, if multiple MAC SDUs have the same identifier of the transmission source and the same identifier of the transmission destination, the multiple MAC SDUs on the logical channel may be multiplexed into one MAC PDU.

Furthermore, one radio bearer that is used in the device-to-device data communication is mapped only to one identifier of the transmission destination (to a Destination Layer 2 ID). Moreover, multiple radio bearers may be mapped to one identifier of the transmission destination.

[Access Class]

In a mobile communication system that is stipulated in 3GPP, each of the terminal devices retains any one among Access Classes (ACs) 0 to 9. The Access Class is retained in a SIM (USIM) in which information of a contractor is typically stored.

Furthermore, in some cases, a special terminal device for a network administer, a police officer, a government official, or the like retains ACs 11 to 15. Moreover, an AC 10 is an AC for an emergency call, not one that is retained in the terminal device, and for example, is an AC that, in the case of Japan, is used in an emergency, such as 110 number or 119 number.

[Access Control (Access Restriction)]

In EUTRA, the terminal device is constituted in such a manner that it is determined whether or not the transmission can be performed, depending on a type of call, such as a call responding to an incoming call, an emergency call, an outgoing call (call origination), or a signaling call, or depending on the Access Class to which the terminal device itself belongs or on restriction information that is included in the broadcast information.

Specifically, in System Information Block Type 2 (SIB 2) that is the broadcast information, "ac-BarringForMO-Data" for restricting access by the terminal device, and "ac-BarringForMo-Signalling" for restricting control signaling transmission by the terminal device are included as access restriction information, and each of ac-BarringFactor, ac-BarringTime, and ac-BarringForSpecialAC, which will be described below, is included as a parameter. ac-BarringFactor is a parameter indicting the probability that the terminal device will perform the communication, and in a current state, a value from 0 to 0.95 at a scale of 0.05 is configured for ac-BarringFactor. In a case where a value that is a random number that is generated in the terminal device itself (that is equal to or greater than 0 and is smaller than 1) is smaller than a value that is ac-BarringFactor, the terminal is permitted to perform the communication. In a case where the value that is the radom number is equal to or greater than the value that is ac-BarringFactor, for a duration that is based on a value that is ac-BarringTime, the terminal device is precluded from gaining access. Additionally, 5-bit information indicating whether or not the terminal device that belongs to special Access Classes (ACs 11 to 15) is a target for the access restriction is configured for ac-BarringForSpecialAC.

Furthermore, "ssac-BarringForMMTEL-Voice-r9" and "ssac-BarringForMMTEL-Video-r9" for performing the access restriction using an IMS/MMTEL function, and "ac-BarringForCSFBr10" for the access restriction for CSFB are included in SIB 2, and have the same parameters as those described above. Furthermore, "eab-Param-r11" for the access restriction for MTC is included in SIB 14, and 10-bit information indicating whether or not which of the Access Classes (ACs 0 to 9) is precluded from being accessed is configured for eab-BarringBitmap-r11.

In an AS function, as a timer for time-tracking a duration during which the access is precluded, a timer (T303) during which an outgoing call from the terminal device is precluded, a timer (T305) during which signaling from the terminal device is precluded, or a timer (T306) during which CSFB outgoing call from the terminal device is used. That is, with access restriction check in the AS function, if T302 or each timer described above is running, the access is regarded as being restricted. In a case where the timer is not running, the restriction that is based on the access restriction information is checked for, and in a case where the access is restricted, a duration that is configured based on the value that is ac-BarringTime is configured, as a duration (Tbarring) during which the access is precluded, for any of the timers based on a type of transmission data. Furthermore, at the time of RRC Connection Establishment, in a case where rejection is caused by the base station apparatus, an access preclusion duration (waitTime) that is included in an RRC-ConnectionReject message is configured for THE timer T302 and is timed. Based on timing states (whether or not the timer is running) of these timers, a state of the restriction of the access by the terminal device to the network is determined.

A portion of a procedure at the time of the RRC Connection Establishment by a terminal device in the related art will be described below referring to a flowchart in FIG. 10.

In the AS function of the terminal device in the idle state, the procedure for the RRC Connection Establishment is initiated based on a request of a higher layer. The terminal device determines whether or not the RRC Connection Establishment (Setup) is access (MTC access) in accordance with Extended Access Barring (EAB) (Step S1001), checks for the access restriction based on the access restriction information relating to the EAB that is included in SIB 14, in the case of the access in accordance with the EAB, and notifies the higher layer that the restriction is in progress and that the establishment fails, if the access to the Access Class that the terminal device itself retains is restricted (Step S1002).

Next, the terminal device determines whether or not the RRC Connection Establishment is for the call responding to the incoming call (Step S1003), and, in a case where the establishment is for the call responding to the incoming call, determines whether or not the timer T302 is running (Step S1004). If the timer T302 is running, the higher layer is notified that the restriction is in progress and that the establishment fails (Step S1005). If the timer T302 is not running in Step S1004, proceeding to Step S1024 takes place.

Next, the terminal device determines whether or not the RRC Connection Establishment is for the emergency call (Step S1006). In a case where the RRC Connection Establishment is for the emergency call, if a value that is ac-BarringForEmergency, which is included in SIB2, is true, when the terminal device itself does not retain the Access Classes 11 to 15, the terminal device determines that the access restriction is in progress. Furthermore, when the terminal device itself retains the Access Classes 11 to 15, the terminal device determines whether or not the access restriction is in progress, based on ac-BarringForSpecialAC. In a case where it is determined that the access restriction is in progress, the higher layer is notified that the establishment fails (Step S1007).

Next, the terminal device determines whether or not the RRC Connection Establishment is for the call origination from the terminal device itself (Step S1008). In a case where the RRC Connection Establishment is for the call origination T303, the terminal device checks for the access restriction based on ac-BarringForMO-Data that is included in SIB 2 and on a timing state of the timer (Step S1009). In a case where the access is not restricted, processing to Step S1024 takes place. In a case where the access is restricted, it is determined whether or not the terminal device itself is a terminal that supports CSFB (Step S1010), and in a case where the terminal device itself is not a terminal that supports CSFB, the terminal device starts to run the timer T303, and notifies the higher layer that the restriction is in progress and that the establishment fails (Step S1011). In a case where in Step S1010, the terminal device itself is the terminal that supports CSFB, it is determined whether or not ac-BarringForCSFB is included in SIB 2 (Step S1012), and in a case where ac-BarringForCSFB is not included in SIB 2, proceeding to Step S1024 takes place. In a case where ac-BarringForCSFB is included in SIB 2 in Step S1010, a value of the time T303 is configured for the timer T306 and thus the timer T306 is caused to start to run (Step S1013), and the higher layer is notified that the restriction is in progress and that the establishment fails (Step S1014).

Next, the terminal device determines whether or not the RRC Connection Establishment is for the signaling call from the terminal device itself (Step S1015). In a case where the RRC Connection Establishment is for the signaling call from the terminal device itself, the terminal device checks for the access restriction based on ac-BarringForMO-Signalling that is included in SIB 2 (Step S1016). In a case where the access is not restricted, processing to Step S1024 takes place. If the access is restricted, the timer T305 is caused to start to run, and the higher layer is notified that the restriction is in progress and that the establishment fails (Step S1017).

Next, the terminal device determines whether or not the RRC Connection Establishment is for CSFB from the terminal device itself (Step S1018). In a case where the RRC Connection Establishment is for CSFB from the terminal device itself, the terminal device determines whether or not ac-BarringForCSFB is included in SIB 2 (Step S1019). In a case where ac-BarringForCSFB is included in SIB 2, the terminal device checks for the access restriction based on ac-BarringForCSFB (Step S1020), and proceeding to Step S1024 takes place. If the access is restricted, the timer T306 is caused to start to run, and the higher layer is notified that the restriction is in progress and that the establishment fails (Step S1021). In a case where ac-BarringForCSFB is not included in SIB 2 in Step S1019, the access restriction is checked for based on ac-BarringForMO-Data that is included in SIB 2 (Step S1022), and in a case where the access is not restricted, proceeding to Step S1024 takes place. In a case where the access is restricted, a value of the timer T306 is configured and the timer is caused to start to run. Furthermore, if the timer T303 is caused to start to run, a value of T306 is configured for T303 and thus the timer is caused to start to run, and the higher layer is notified that the restriction is in progress and that the establishment fails (Step S1023).

In Step S1024, the terminal device performs configuration of the physical channel, the MAC layer, or the like, and transmits a RRCConnectionRequest message to the base station apparatus. A description of processing after the transmission of the RRCConnectionRequest message is omitted, but with the above-described processing, the access control can be performed that is based on a congestion situation of a network and the like.

The timer T303, T305, or T306 that is running stops when the terminal device enters the connected state, but makes the cell reselection.

Furthermore, if the timer T303, T305, or T306, which is described above, expires or stops, and the timer T302 is not running, the higher layer is notified that the restriction is alleviated.

Suitable embodiments of the present invention will be described in detail below considering the matters described above and referring to the accompanying drawings. Moreover, when the embodiments of the present invention are described, in a case where it is determined that a specific description of a known function or constitution associated with the embodiments of the present invention makes the gist of the embodiment of the present invention indefinite, a detailed description thereof is omitted.

First Embodiment

A first embodiment of the present invention will be described in detail below.

FIG. 1 is a block diagram illustrating an example of a terminal device 1 according to the first embodiment of the present invention. The present terminal device 1 is constituted at least from a reception unit 101, a demodulation unit 102, a decoding unit 103, a reception data control unit 104, a physical layer control unit 105, a transmission data control unit 106, a coding unit 107, a modulation unit 108, a transmission unit 109, a radio resource control unit 110, and a non-access layer control unit 111. The "units" in the drawings are elements that are also expressed with the terms circuit, constituent element, device, unit, and the like and that realize a function of the terminal device 1 and each procedure.

The non-access layer control unit 111 is a block that performs a function of a Non-Access Stratum layer (NAS) which executes control between the terminal device 1 and the core network. Furthermore, the radio resource control unit 110 is a block that performs each function of the Radio Resource Control (RRC) layer which executes radio resource control of the terminal device 1. Furthermore, the reception data control unit 104 and the transmission data control unit 106 are blocks that perform each function in a Medium Access Control (MAC) layer that manages a data link layer, a Radio Link Control (RLC) layer, and a Packet Data Convergence Protocol (PDCP) layer.

Moreover, the terminal device 1 may be constituted to include some or all of blocks (the reception unit 101, the demodulation unit 102, and the decoding unit 103) in a reception system and multiple frequencies (frequency bands and frequency bandwidths), and blocks (the coding unit 107, the modulation unit 108, and the transmission unit 109) in a transmission system, in order that, by using carrier aggregation and/or the device-to-device communication, transmission and reception processing at multiple frequencies (frequency bands or frequency bandwidths) or within the same subframe of a cell is supported.

With regard to the reception processing by the terminal device 1, reception data control information is input from the radio resource control unit 110 into the reception data control unit 104, and physical layer control information that is a control parameter for controlling each block is input into the physical layer control unit 105. The physical layer control information is information that is constituted from reception control information and transmission control information and that includes a parameter configuration indispensable for wireless communication control by the terminal device 1.

The physical layer control information is configured by a wireless connection resource configuration that is transmitted in a dedicated manner from the base station apparatus 2 to the terminal device 1, cell-specific broadcast information, a system parameter, or the like, and, if need arises, is input by the radio resource control unit 110 into the physical layer control unit 105. The physical layer control unit 105 suitably inputs the reception control information, which is control information relating to the reception, to the reception unit 101, the demodulation unit 102, and the decoding unit 103.

Included in the reception control information are pieces of information, as downlink scheduling information, such as reception frequency band information, reception timing relating to the physical channel and the physical signal, a multiplexing method, and radio resource control information. Furthermore, the reception data control information is downlink control information that includes secondary cell deactivation timer information, DRX control information, multicast data reception information, downlink retransmission control information, and the like. Additionally, control information relating to the downlink in each of the MAC layer, the RLC layer, and the PDCP layer is included in the reception data control information.

The reception signal is received in the reception unit 101. The reception unit 101 receives a signal from the base station apparatus 2 in accordance with the frequency and the frequency band that are notified with the reception control information. The signal that is received is input into the demodulation unit 102. The demodulation unit 102 performs demodulation of the signal. The demodulation unit 102 inputs a post-demodulation signal into the decoding unit 103. The decoding unit 103 decodes the signal that is input, and inputs each piece of data (which is also referred to as downlink data, downlink control data, or a downlink transport block) that results from the decoding, into the reception data control unit 104. Furthermore, as well as each piece of data, the MAC control element that is transmitted from the base station apparatus 2 is decoded in the decoding unit 103, and related data is input into the reception data control unit 104.

The reception data control unit 104 performs control (for example, cell activation/deactivation, DRX control, transmission timing adjustment, and the like) of the physical layer control unit 105, which is based on the received MAC control element, performs buffering of each piece of data that results from the decoding, and performs error correction control (HARQ) of data that is retransmitted. Among pieces of data that are input into the reception data control unit 104, related data is input into (transferred to) the radio resource control unit 110. Furthermore, among pieces of data that are input into the radio resource control unit 110, related data is input into (transferred to) the non-access layer control unit 111.

With regard to the transmission processing by the terminal device 1, transmission data control information is input from the radio resource control unit 110 into the transmission data control unit 106, and the physical layer control information that is a control parameter for controlling each block is input into the physical layer control unit 105. The physical layer control unit 105 suitably inputs the transmission control information that is control information relating to the transmission, into the coding unit 107, the modulation unit 108, and the transmission unit 109. Included in the transmission control information are pieces of information, as uplink scheduling information, such as coding information, modulation information, transmission frequency band information, transmission timing relating to the physical channel and the physical signal, the multiplexing method, and the radio resource arrangement information.

Furthermore, the transmission data control information is uplink control information that includes DTX control information, the random access configuration information, uplink shared channel information, logical channel priority information, resource request configuration information, cell group information, uplink retransmission control information, and the Buffer Status Report. The radio resource control unit 110 may configure multiple pieces of random access configuration information that correspond to multiple cells, respectively, for the transmission data control unit 106.

Furthermore, the radio resource control unit 110 manages the transmission timing adjustment information and the transmission timing timer that are used for adjustment of the uplink transmission timing, and manages an uplink transmission timing state (a transmission timing adjusted state or a transmission timing non-adjusted state) for every cell (every cell group or every TA group). The transmission timing adjustment information and the transmission timing timer are included in the transmission data control information.

Furthermore, the radio resource control unit 110 interprets the RRC message that is input from the reception data control unit 104 and acquires information relating to the access restriction using the AS function.

Furthermore, when the terminal device 1 itself makes an outgoing call, in a case where the radio bearer that is configured for every identifier of the transmission destination for the device-to-device data communication is used, the higher layer (the non-access layer control unit 111) may perform configuration in such a manner that a cause of the establishment (EstablishmentCause that is included in an RRC connection request) when establishing the wireless connection is the transmission for making a normal outgoing call, and notify the radio resource control unit 110 of this. Data (an IP packet) that is mapped to the radio bearer may be mapped, in the transmission data control unit 106, to the PTCH that is the logical channel which is used in the device-to-device data communication, and data that is mapped to the PTCH may be mapped to the PSCH that is the transport channel which is used in the device-to-device data communication. By recognizing or controlling some or all of the mapping, the radio resource control unit 110 may regard the data as data for the device-to-device data communication.

Moreover, in a case where there is a need to manage multiple uplink transmission timing states, the transmission data control unit 106 manages the transmission timing adjustment information that corresponds to the uplink transmission timing in each of the multiple cells (the cell group or the TA group). Included in the resource request configuration information are at least maximum transmission counter configuration information and radio resource request prohibition timer information. The radio resource control unit 110 may configure multiple pieces of resource request configuration information that correspond to multiple cells, respectively, for the transmission data control unit 106.

The transmission data (which is also referred to as the uplink data, the uplink control data, or an uplink transport block) that is originated in the terminal device 1 is input from the radio resource control unit 110 into the transmission data control unit 106 at an arbitrary timing. At this time, the transmission data control unit 106 calculates an amount of transmission data (an amount of uplink buffer) that is input. Furthermore, the transmission data control unit 106 has a function of determining whether the transmission data that is input is data that belongs to the control-plane or is data that belongs to the user-plane. Furthermore, the transmission data control unit 106 has a function of determining whether the transmission data that is input is data (first transmission data) for the base station apparatus 2 or data (second transmission data) for the device-to-device data communication.

Furthermore, when the transmission data is input, the transmission data control unit 106 stores the transmission data in an uplink buffer (not illustrated) within the transmission data control unit 106. Furthermore, based on a priority level of the transmission data that is stored in the uplink buffer, the transmission data control unit 106 generates the MAC PDU that does not perform multiplexing and assembling. Then, the transmission data control unit 106 determines whether or not the radio resource indispensable for the transmission of the transmission data that is input is allocated to the terminal device 1. The transmission data control unit 106 selects any one of the radio resource request that uses the Physical Uplink Shared Channel (PUSCH) and the Physical Uplink Control Channel (SR-PUCCH) and the radio resource request that uses the Physical Random Access Channel, based on radio resource allocation, and makes a request to the physical layer control unit 105 for control processing for transmitting the selected channel.

Based on a channel architecture in which each piece of coded data is transmitted, the modulation unit 108 performs suitable modulation processing. As well as mapping each piece of data being modification-processed to the frequency domain, the transmission unit 109 converts a signal in the frequency domain into a signal in the time domain, superimposes the resulting signal on a carrier wave in a fixed frequency, and performs power amplification. In accordance with the transmission timing adjustment information for every cell (every cell group or every TA group), which is input from the radio resource control unit 110, the transmission unit 109 further adjusts the uplink transmission timing. It is also possible that the Physical Uplink Shared Channel to which the uplink control data is mapped includes, for example, the layer 3 message (a radio resource control message or the RRC message) in addition to the user data.

Other constituent elements of the terminal device 1 and a transfer path for data (the control information) between the constituent elements are omitted in FIG. 1, but it is apparent that multiple blocks that have other functions indispensable for the terminal device 1 to operate are retained as constituent elements. For example, in addition to the non-access layer control unit 111 of the NAS layer that executes the control between the terminal device 1 itself and the core network, an application layer unit is present above the radio resource control unit 110. Furthermore, according to the present embodiment, the example in which the non-access layer control unit 111 executes the device-to-device data communication as well is described, but no limitation to this is imposed. For the control of the device-to-device data communication, an independent D2D control unit may execute one or several portions or all portions of the control of the device-to-device data communication that will be described below.

Figure 2:
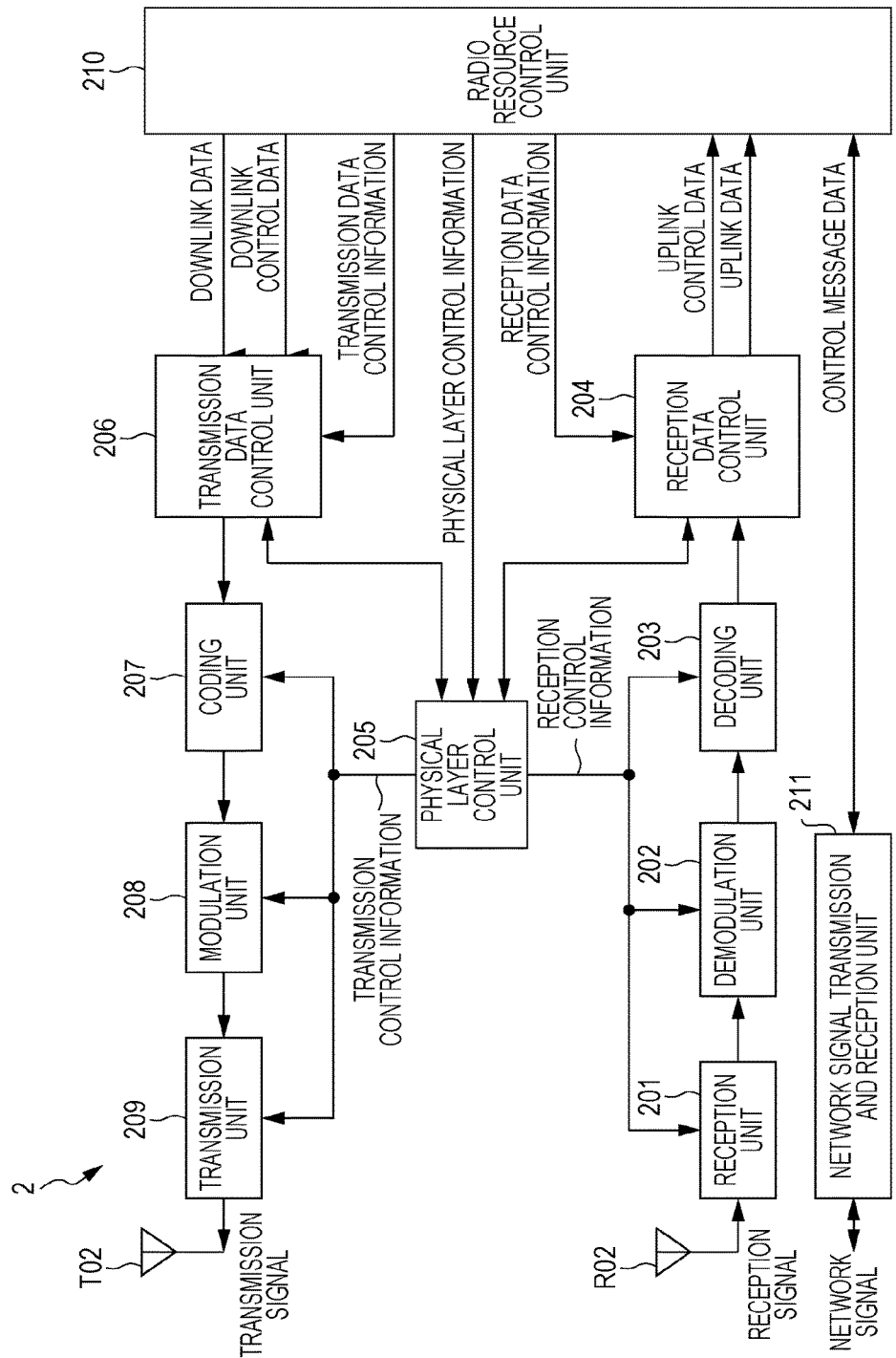
FIG. 2 is a block diagram illustrating an example of a schematic constitution of a base station apparatus according to the embodiment of the present invention.

FIG. 2 is a block diagram illustrating an example of a base station apparatus 2 according to the first embodiment of the present invention. The present base station apparatus is constituted at least from a reception unit 201, a demodulation unit 202, a decoding unit 203, a reception data control unit 204, a physical layer control unit 205, a transmission data control unit 206, a coding unit 207, a modulation unit 208, a transmission unit 209, a radio resource control unit 210, and a network signal transmission and reception unit 211. The "units" in the drawings are elements that are also expressed with the terms circuit, constituent element, device, unit, and the like and that perform a function of the base station apparatus 2 and execute each procedure.

The radio resource control unit 210 is a block that performs each function of the Radio Resource Control (RRC) layer that executes the radio resource control of the base station apparatus 2. Furthermore, the reception data control unit 204 and the transmission data control unit 206 are blocks that perform each function in the Medium Access Control (MAC) layer that manages the data link layer, the Radio Link Control (RLC) layer, and the Packet Data Convergence Protocol (PDCP) layer.

Moreover, the base station apparatus 2 may be constituted to include some or all of blocks (the reception unit 201, the demodulation unit 202, and the decoding unit 203) in a reception system, and multiple frequencies (frequency bands and frequency bandwidths) and blocks (the coding unit 207, the modulation unit 208, and the transmission unit 209) in a transmission system, in order that, by using the carrier aggregation and the like, the transmission and reception processing at multiple frequencies (frequency bands or frequency bandwidths) or within the same subframe of a cell is supported.

The radio resource control unit 210 inputs the downlink data and the downlink control data into the transmission data control unit 206. In a case where the MAC control element that is to be transmitted to the terminal device 1 is present, the transmission data control unit 206 inputs the MAC control element and each piece of data (the downlink data or the downlink control data) into the coding unit 207. The coding unit 207 codes the MAC control element and each piece of data, which are input, and inputs results of the coding into the modulation unit 208. The modulation unit 208 performs modulation of the coded signal.

Furthermore, the radio resource control unit 210 may create the RRC message that includes in the broadcast information the information relating to the access restriction using the AS function in the terminal device 1, and may output the created RRC message to the transmission data control unit 206.

Furthermore, the radio resource control unit 210 may create the RRC message in which the access restriction information on the device-to-device data communication is included, and may output the created RRC message to the transmission data control unit 206.

Furthermore, a signal that is modulated in the modulation unit 208 is input into the transmission unit 209. After mapping each piece of data being input to the frequency domain, the transmission unit 209 converts a signal in the frequency domain into a signal in the time domain, superimposes the resulting signal on a carrier wave in the fixed frequency, performs the power amplification, and performs the transmission. The Physical Downlink Shared Channel to which the downlink control data is mapped typically constitutes the layer 3 message (the RRC message).

Furthermore, the reception unit 201 converts the signal that is received from the terminal device 1 into a digital signal in a baseband. In a case where cells at multiple different transmission timings are configured for the terminal device 1, the reception unit 201 receives the signal at different timings for every cell (every cell group or every TA group). The digital signal that results from the conversion in the reception unit 201 is input into the demodulation unit 202 and is demodulated. The signal that results from the demodulation in the demodulation unit 202 is subsequently input into the decoding unit 203. The decoding unit 203 decodes the signal that is input, and inputs each piece of data (the uplink data and the uplink control data) that results from the decoding, into the reception data control unit 204. Furthermore, as well as each piece of data, the MAC control element that is transmitted from the terminal device 1 is decoded in the decoding unit 203, and related data is input into the reception data control unit 204.

The reception data control unit 204 performs control (for example, control relating to a power headroom report, control relating to the Buffer Status Report, or the like) of the physical layer control unit 205, which is based on the received MAC control element, performs buffering of each piece of data that results from the decoding, and performs the error correction control (HARQ) of data that is retransmitted. Each piece of data that is input into the reception data control unit 204 is input into (transferred to) the radio resource control unit 210.

Furthermore, in a case where the Buffer Status Report from the terminal device 1 is input from the decoding unit 203, the reception data control unit 204 determines whether the transmission resource request is a transmission resource request for communication with the base station apparatus itself or a transmission resource request for the device-to-device data communication, and configures a transmission resource that is to be allocated to the terminal device 1.

The physical layer control information that is indispensable for these type of control of each block is information that is constituted from reception control information and transmission control information and that includes a parameter configuration indispensable for wireless communication control by the base station apparatus 2. The physical layer control information is configured by the higher-level network apparatus (an MME, a gateway apparatus (SGW), an OAM, or the like) or the system parameter, and, if need arises, is input by the radio resource control unit 210 into the control unit 204.

The physical layer control unit 205 inputs the physical layer control information associated with the transmission, as the transmission control information, into each of the blocks, that is, the coding unit 207, the modulation unit 208, and the transmission unit 209, and suitably inputs the physical layer control information associated with the reception, as the reception control information, into each of the blocks, that is, the reception unit 201, the demodulation unit 202, and the decoding unit 203.

The control information relating to the uplink, of the terminal device 1 for each of the MAC layer, the RLC layer, and the PDCP layer of the base station apparatus 2 is included in the reception data control information. Furthermore, the control information relating to the downlink, of the terminal device 1 for each of the MAC layer, the RLC layer, and the PDCP layer of the base station apparatus 2 is included in the transmission data control information. That is, the reception data control information and transmission data control information are configured for every terminal device 1.

The network signal transmission and reception unit 211 performs the transmission (transfer) or reception of a control message between the base station apparatuses 2 or between the higher-level network apparatus (the MME or the SGW) and the base station apparatus 2, or of the user data. Other constituent elements of the base station apparatus 2 and the transfer path for data (the control information) between the constituent elements are omitted in FIG. 2, but it is apparent that multiple blocks that have other functions indispensable for the base station apparatus 2 to operate are retained as constituent elements. For example, a Radio Resource Management unit or an application layer unit is present over the radio resource control unit 210.

Figure 3:
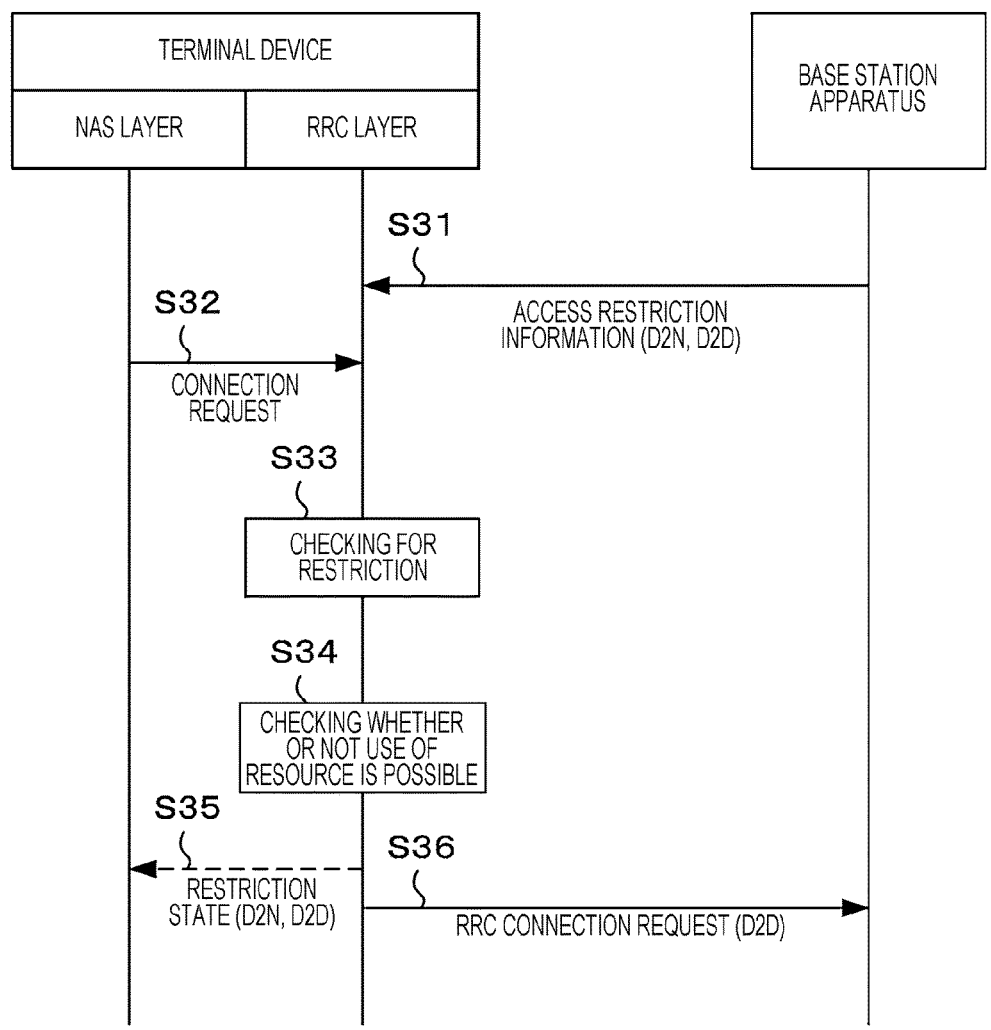
FIG. 3 is a diagram illustrating an example of a sequence chart for access control when requesting a transmission resource that is used in device-to-device data communication according to a first embodiment of the present invention.

Next, an example of the access control when the terminal device 1 in the idle state makes a request to the base station apparatus 2 for the transmission resource that is used in the device-to-device data communication is described referring to FIG. 3.

In FIG. 3, the terminal device 1 acquires the information relating the access restriction from the broadcast information of the serving cell (Step S31). Included in the information relating to the access restriction are ac-BarringForMO-Data or ac-BarringForMO-Signalling, ac-BarringForEmergency, and the like that, if need arises, are broadcast in SIB 2.

In the terminal device 1 that performs the device-to-device data communication, the NAS layer (the non-access layer control unit 111) of the terminal device 1 makes a request to the radio resource control unit 110 for reestablishment of radio resource control connection (RRC connection) (Step S32), and the radio resource control unit 110 checks for the restriction based on the cause of the establishment (Step S33).

In Step S32, the radio resource control unit 110 is notified by the non-access layer control unit 111 of the reason for the reestablishment request. As the causes of the establishment, there are an emergency call, a priority call, a connection for response, a connection for a control signal transmission, a connection for data communication, and the like. Furthermore, information on whether the establishment of the RRC connection is for connection for D2N communication or is for connection for the D2D communication (the request for the radio resource for the D2D communication) is also notified as an object (an object of the establishment) of the establishment request. At this point, in a case where data to be transmitted is mapped to a specific radio bearer or is mapped to the PTCH that is the logical channel which is used in the device-to-device data communication or to the PSCH that is the transport channel, the object of the establishment may be regarded as being the D2D communication (the request for the radio resource for the D2D communication). Furthermore, the object of the establishment may be included in one or several of the causes of the establishment. For example, the emergency call, the priority call, or the like is configured as the cause of the establishment, and whether the connection is for the D2N communication or for the D2D communication may be configured as a parameter separate from these. Furthermore, the establishment reason that can distinguish between the configuration for the D2D communication and the connection for the D2N communication may be configured. That is, the priority call for the D2N communication and the priority call for the D2D communication may be configured as the cause of the establishment separately from each other. Furthermore, the emergency call or the priority call may be configured as the cause of the establishment, and the object of the establishment may be determined depending upon whether or not the data to be transmitted is mapped to the radio bearer that is used in the D2D communication, or whether or not the data to be transmitted is mapped to the PTCH that is the logical channel which is used in the D2D communication or to the PSCH that is the transport channel.

Figure 10:
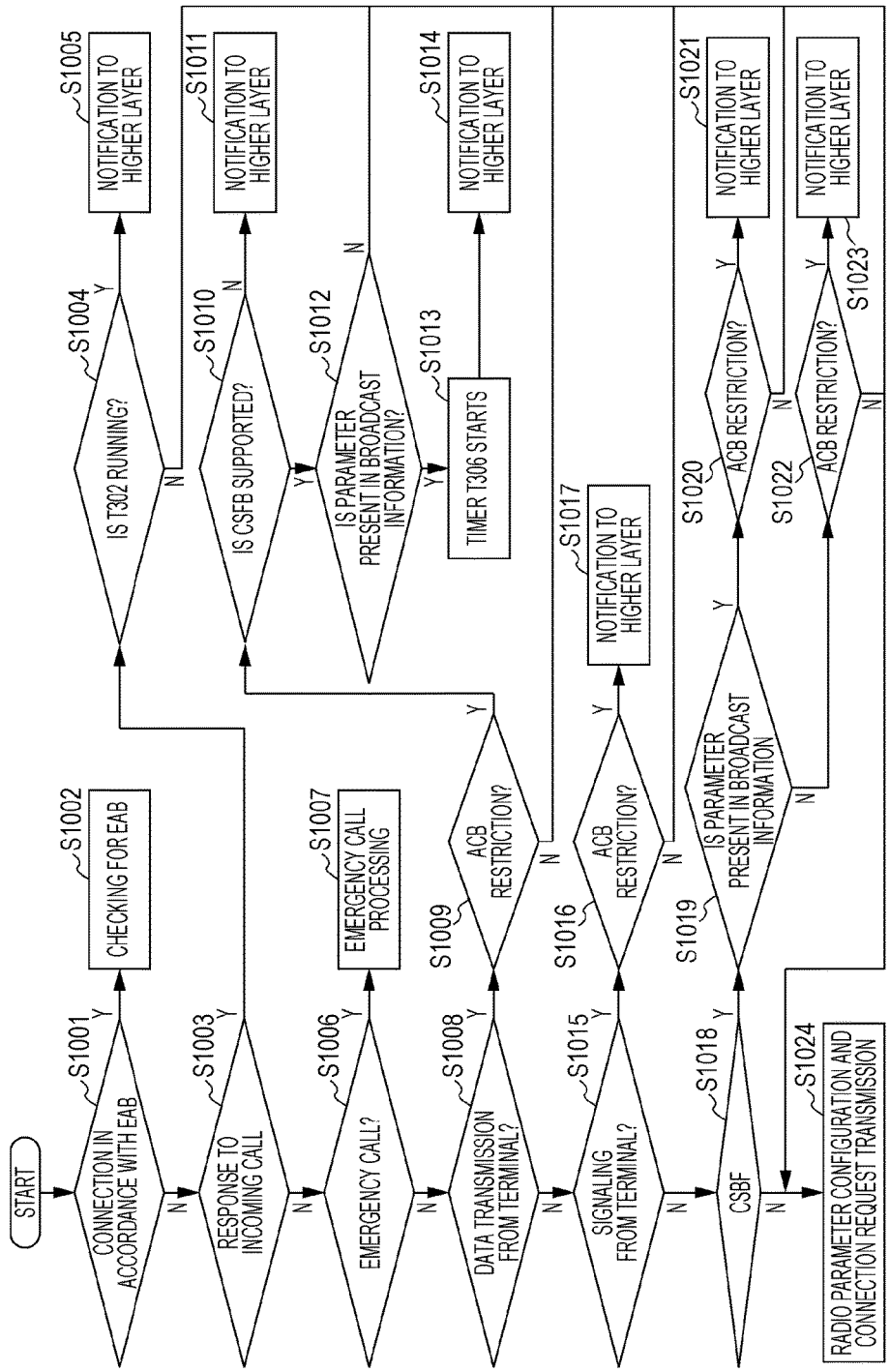
FIG. 10 is a diagram illustrating an example of a flowchart relating to establishment of an RRC connection to the base station apparatus by a terminal device in the related art.

In Step S33, the radio resource control unit 110 performs the access control that is described referring to FIG. 10, regardless of whether the object of the establishment of the RRC connection is the connection for the D2N communication or the connection for the request for the radio resource for the D2D communication.

Moreover, in a case where the object of the establishment of the RRC connection is the connection for the request for the radio resource for the D2D communication, ac-BarringForSpecialAC that is broadcast separately for the time when the connection is for the request for the radio resource for the D2D communication, not ac-BarringForSpecialAC that is included in ac-BarringForMO-Data, ac-BarringForMO-Signalling, or the like, which is acquired in Step S31, may be used.

Furthermore, the access control of the emergency call in the D2D communication may be performed using the information relating to the access control, which is broadcast separately for the time when the connection is for the request for the radio resource for the D2D communication, not ac-BarringForEmergency. Alternatively, the information indicating whether or not the access restriction is checked for in the radio resource control unit 110 at the time of the connection for the request for the radio resource for the D2D communication may be broadcast.

Additionally, for one or serval of or all of the timers that are used in the determination of whether or not the access restriction is in progress in the checking for the restriction in Step S33, the timer for the D2N communication and the timer that is used for the connection for the request for the radio resource for the D2D communication may be retained separately from each other.

As a result of checking for the restriction in Step S33, in a case where the access is not permitted, or in a case where the restriction is in progress while the timer, such as T303, T305, or T306, is running, when a Mode 2 transmission resource can be used based on information on whether or not the Mode 2 transmission resource at the time of the access restriction is used, which is included in the information that is acquired in Step S31, the radio resource control unit 110 performs the device-to-device data communication that uses a resource in a Mode 2 transmission resource pool. Furthermore, when the Mode 2 transmission resource is difficult to use, the radio resource control unit 110 notifies the non-access layer control unit 111 that the device-to-device data communication is restricted (Step S35). Furthermore, as a result of checking for the restriction in Step S33, in a case where the access is not performed, even when a configuration of the Mode 2 transmission resource is not broadcast, the non-access layer control unit 111 may be notified that the device-to-device data communication is restricted. At this point, in a case where the timer for determining whether or not the access restriction is in progress is independent, a restriction state of the D2N communication and a restriction state of the device-to-device data communication are independent of each other and are notified to the non-access layer control unit 111. However, in a case where the timer is shared, although the timer is running (the access restriction is in progress), when the Mode 2 transmission resource can be used, the restriction information may be notified to the non-access layer control unit 111, without the restriction of the device-to-device data communication being performed (or with the restriction of the device-to-device data communication being alleviated).

As a result of checking for the restriction in Step S33, in a case where the access is permitted, the radio resource control unit 110 initiates the random access procedure in order to make the RRC connection request to the base station apparatus 2 (Step S36). At this point, even in a case where the object of the establishment is included in one or several of the causes of the establishment, the terminal device 1 may select the cause of the establishment that is included in an RRC connection request message, from the existing reasons (the emergency call, the priority call, a response to the incoming call, access for the signaling, and access for the data communication), and may notify whether the connection request is for the D2N communication or for the connection for the request for the radio resource for the D2D communication, as additional information.

With this constitution, because the terminal device 1 can control the state of the restriction or alleviation of the device-to-device data communication independently of the D2N communication, based on the information relating to the access restriction and Mode 2 transmission resource pool information, which are broadcast from the base station apparatus 2, the terminal device 1 can suitably perform the access control when performing the device-to-device data communication.

According to the present embodiment, the base station apparatus 2 may broadcast the configuration of the Mode 2 transmission resource that can be used by the terminal device 1 (that, for example, can be used at the time of the access restriction of the connection for the request for the radio resource for the D2D communication) in a case where a specific condition is satisfied. With this constitution, even in a case where the Mode 2 transmission resource that can be used in a normal idle state, which is notified with the broadcast information, is not present, congestion alleviation is possible by making it possible for the terminal device 1 that is subject to the restriction at the time of the access restriction to be able to use the Mode 2 transmission resource. Furthermore, in this case, when a duration during which the access is restricted, the use of the Mode 2 transmission resource may be immediately stopped, and the Mode 2 transmission resource may be used until the connection for the request for the radio resource for the D2D communication is successful (or until the Mode 1 transmission resource is allocated).

Furthermore, according to the present embodiment, the terminal device 1 appropriates ac-BarringForMO-Data, ac-BarringForMO-Signalling, or ac-BarringForEmergency, which is a parameter for an existing access restriction, but no limitation to this is imposed. A parameter (ac-BarringForD2D) that is a parameter which is used at the time of the connection for the request for the radio resource for the D2D communication may be used. In this case, information (configuration) of the Mode 2 transmission resource pool that can be used at the time of the access restriction described above may be broadcast in a state of being included in the parameter. Furthermore, a parameter that is used for the determination of whether or not the access restriction is in progress may be retained independently of the timer for the D2N communication, and information indicating an access restriction duration, which is included in the parameter, may be time-tracked. With this constitution, suitable access control can be performed.

Furthermore, according to the present embodiment, in a case where the use of the Mode 2 transmission resource is possible with the broadcast information, only when the cause of the establishment of the RRC connection, which is notified by the non-access layer control unit 111 is the emergency call or the priority call, the terminal device 1 may attempt to make a connection for the request for the radio resource for the D2D communication. Alternatively, the information (the configuration) of the Mode 2 transmission resource pool, which can be used in a case where a specific condition is satisfied (which, for example, can be used in the case of the emergency call or the priority call), may be broadcast. With this constitution, the transmission resource can be efficiently allocated to the terminal device 1 that needs to preferentially perform the communication.

Furthermore, according to the present embodiment, the terminal device 1 is described as performing the access control using the Access Class that is retained by the terminal device 1 itself, but no limitation to this is imposed. Access class information that is used at the time of the connection for the request for the radio resource for the device-to-device data communication or the D2D communication may be configured. For example, this configuration may be performed at a stage prior to the shipment of the terminal device 1, and after the shipment, a connection to an authentication apparatus (an authentication server or the like) through the base station apparatus 2 or the like may be made for the configuration. Furthermore, a connection to a small-sized authentication device or the like may be made in a wired or wireless manner for the configuration. With this constitution, because the Access Class when performing normal communication with the base station apparatus 2 and the Access Class when performing the Device-to-device data communication can be configured separately from each other, flexible access control can be performed.

According to the first embodiment, based on the information relating to the access restriction and the Mode 2 transmission resource pool information, which are broadcast from the base station apparatus 2, and on the reason for or the object of the connection request, which the non-access layer control unit 111 of the terminal device 1 makes to the radio resource control unit 110, by checking for the access restriction and making a selection of the radio resource to be used, the terminal device 1 can perform efficient access control.

Second Embodiment

A second embodiment of the present invention will be described below.

According to the first embodiment, the example is described in which, based on the information relating to the access restriction, which is included in the broadcast information and the Access Class that is retained by the terminal device 1, in the radio resource control unit 110, the access control at the time of the connection for the request for the radio resource for the D2D communication is performed. According to the present embodiment, an example is described in which, in the non-access layer control unit 111 of the terminal device 1, the access control at the time of the connection for the request for the radio resource for the D2D communication is performed.

The non-access layer control unit 111 of the terminal device 1 and the radio resource control unit 110 of the base station apparatus 2 according to the present embodiment operate in a different manner than those of the terminal device 1 and the base station apparatus 2 according to the first embodiment, and detailed description of constituent elements other than these are omitted.

According to the present embodiment, the radio resource control unit 110 interprets the RRC message that is input from the reception data control unit 104 and acquires the information relating to the access restriction using the AS function.

Furthermore, according to the present embodiment, the radio resource control unit 110 interprets the RRC message that is input from the reception data control unit 104 and, in a case where the access restriction information on the device-to-device data communication, outputs the data to the higher layer (the non-access layer control unit 111).

Furthermore, according to the present embodiment, the radio resource control unit 110 interprets the RRC message that is input from the reception data control unit 104 and, in a case where the Mode 2 transmission resource can be used, notifies the higher layer (the non-access layer control unit 111) that the use of the Mode 2 transmission resource is possible.

Furthermore, according to the present embodiment, in a case where the cause of the establishment (Establishment-Cause) that is included in the RRC connection request message when establishing the wireless connection, which is designated by the higher layer (the non-access layer control unit 111) is a cause that is determined in advance, when access restriction processing using the AS function is configured to be unnecessary, with information (restriction skipping information) indicating whether or not the access restriction processing in the AS function, which is notified with the broadcast information from the base station apparatus 2, the radio resource control unit 110 skips the access restriction processing at the time of the outgoing call.

Furthermore, according to the present embodiment, when the terminal device 1 makes a call, the higher layer (the non-access layer control unit 111) configures the cause of the establishment (EstablishmentCause that is included in the RRC connection request), based on the information on whether or not the access control using the AS function is indispensable, and notifies the radio resource control unit 110 of this.

Furthermore, according to the present embodiment, when the terminal device 1 itself makes an outgoing call, in the case where the radio bearer that is configured for every identifier of the transmission destination for the device-to-device data communication is used, the higher layer (the non-access layer control unit 111) may perform the configuration in such a manner that the cause of the establishment (EstablishmentCause that is included in an RRC connection request) when establishing the wireless connection is the transmission for making a normal outgoing call, and notify the radio resource control unit 110 of this. The data (the IP packet) that is mapped to the radio bearer may be mapped, in the transmission data control unit 106, to the PTCH that is the logical channel which is used in the device-to-device data communication, and data that is mapped to the PTCH may be mapped to the PSCH that is the transport channel which is used in the device-to-device data communication. By recognizing or controlling some or all of the mapping, the radio resource control unit 110 may regard the data as the data for the device-to-device data communication.

Furthermore, according to the present embodiment, in a case where the terminal device 1 itself performs the device-to-device data communication, the higher layer (the non-access layer control unit 111) may determine whether or not to start the device-to-device data communication and whether to make the RRC connection request or to use the Mode 2 transmission resource, based on the information whether or not the use of the Mode 2 transmission resource that is notified by the radio resource control unit 110 is possible, and on the access restriction information.

Figure 4:
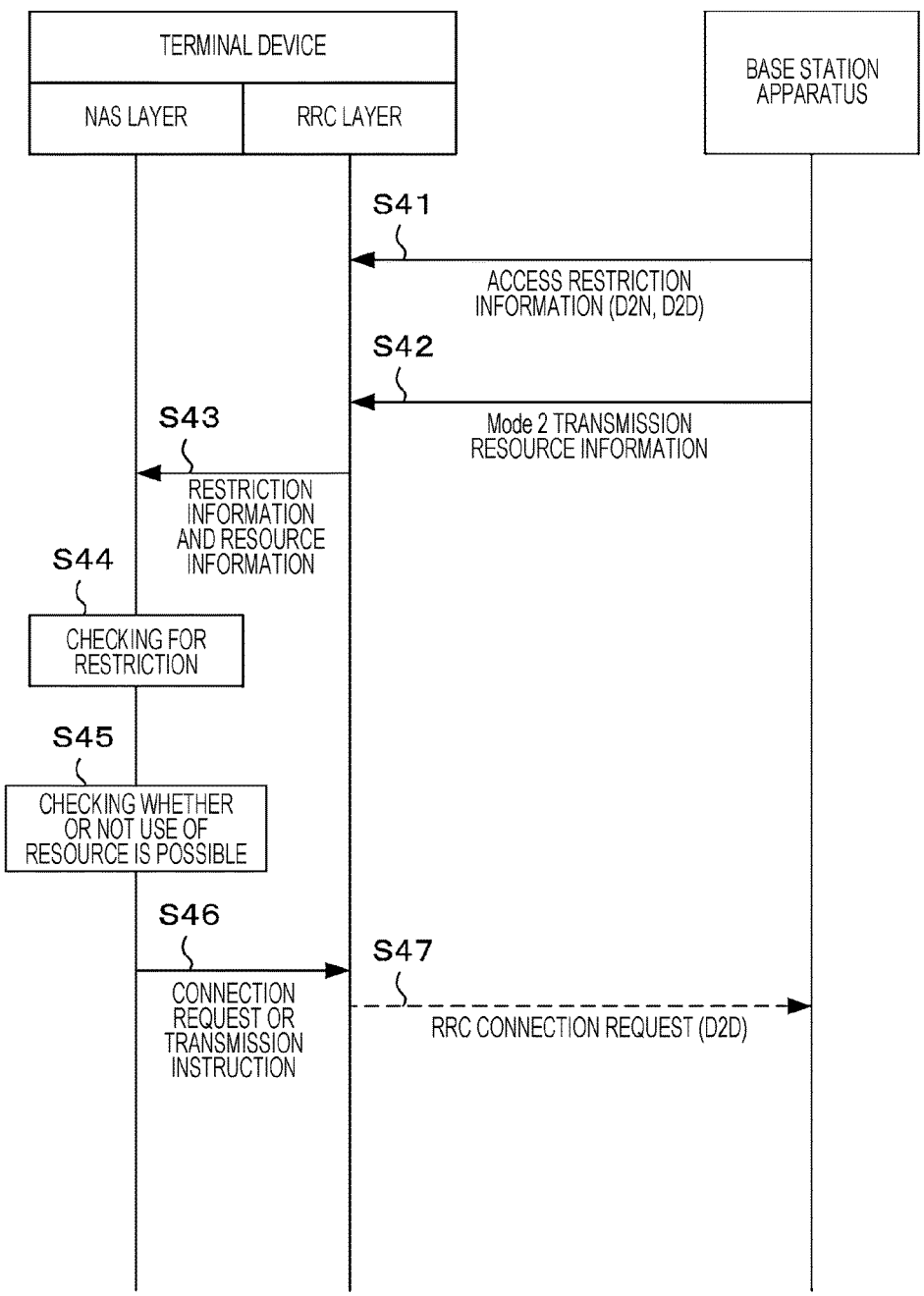
FIG. 4 is a diagram illustrating an example of a sequence chart for access control when requesting a transmission resource that is used in device-to-device data communication according to a second embodiment of the present invention.

Next, according to the present embodiment, an example of the access control when the terminal device 1 in the idle state makes a request to the base station apparatus 2 for the transmission resource that is used in the device-to-device data communication is described referring to FIG. 4.

In FIG. 4, the terminal device 1 acquires the information relating the access restriction from the broadcast information of the serving cell (Step S41). Included in the information relating to the access restriction are ac-BarringForMO-Data or ac-BarringForMO-Signalling, ac-BarringForEmergency, and the like that, if need arises, are broadcast in SIB 2.

Furthermore, the terminal device 1 acquires the Mode 2 transmission resource from the broadcast information of the serving cell (Step S42). Moreover, Step S41 and Step S42 may be in reverse order.

The radio resource control unit 110 notifies the NAS layer (the non-access layer control unit 111) of the terminal device 1 of the access restriction information and the Mode 2 transmission resource information that are acquired in Step S41 and Step S42, respectively (Step S43). At this point, the access restriction information may be access restriction information on the device-to-device data communication that uses the Mode 1 transmission resource and/or the Mode 2 transmission resource. Furthermore, the Mode 2 transmission resource may be information indicating that the use of the Mode 2 transmission resource is possible.

In the terminal device 1 that performs the device-to-device data communication, the NAS layer (the non-access layer control unit 111) of the terminal device 1 checks for the restriction based on the information that is acquired in Step S43 and on the access class that is retained by the terminal device 1 itself (Step S44).

Furthermore, in a case where the Mode 2 transmission resource is difficult to use based on the information that is acquired in Step S43, the NAS layer (the non-access layer control unit 111) of the terminal device 1 makes the request to the radio resource control unit 110 for the establishment of the RRC connection (Step S46), and, based on the establishment request, the radio resource control unit 110 initiates the random access procedure in order to make the request to the base station apparatus 2 for the RRC connection (Step S47).

In Step S45, in a case where the Mode 2 transmission resource can be used, the non-access layer control unit 111 may instruct the radio resource control unit 110 to perform the device-to-device data communication that uses the Mode 2 transmission resource, may determine whether the Mode 1 transmission resource is used or the Mode 2 transmission resource is used (the request is made to the base station apparatus 2 for the transmission resource), based on the group to which the data to be transmitted belongs, the priority level, the access class that is retained by the terminal device 1 itself, or the like, and may perform any processing.

In Step S46, the radio resource control unit 110 is notified by the non-access layer control unit 111 of the reason for the reestablishment request. As the causes of the establishment, there are the emergency call, the priority call, the connection for response, the connection for the control signal transmission, the connection for the data communication, and the like. Furthermore, the information on whether the establishment of the RRC connection is for the connection for the D2N communication or is for the connection for the request for the radio resource for the D2D communication is also notified as the object (the object of the establishment) of the establishment request. At this point, in the case where the data to be transmitted is mapped to a specific radio bearer or is mapped to the PTCH that is the logical channel which is used in the device-to-device data communication or to the PSCH that is the transport channel, the object of the establishment may be regarded as being the request for the radio resource for the D2D communication. Furthermore, the object of the establishment may be included in one or several of the causes of the establishment.

In Step S47, in a case where the object of the establishment of the RRC connection is the connection for the request for the radio resource for the D2D communication, the radio resource control unit 110 may not check for the access restriction. Alternatively, information indicating whether or not to check for the access restriction may be notified or broadcast from the base station apparatus 2.

With this constitution, because the terminal device 1 can control the state of the restriction or alleviation of the device-to-device data communication independently of the D2N communication, based on the information relating to the access restriction and the Mode 2 transmission resource information, which are broadcast from the base station apparatus 2, the terminal device 1 can suitably perform the access control when performing the device-to-device data communication.

According to the present embodiment, the base station apparatus 2 may broadcast the configuration of the Mode 2 transmission resource that can be used by the terminal device 1 (that, for example, can be used at the time of the access restriction of the connection for the request for the radio resource for the D2D communication) in the case where a specific condition is satisfied. In this case, the non-access layer control unit 111 may instruct the radio resource control unit 110 on which resource is used based on a result of checking for the restriction. With this constitution, even in the case where the Mode 2 transmission resource that can be used in a normal idle state, which is notified with the broadcast information, is not present, the congestion alleviation is possible by making it possible for the terminal device 1 that is subject the restriction at the time of the access restriction to be able to use the Mode 2 transmission resource. Furthermore, in this case, when the duration during which the access is restricted ends, the use of the Mode 2 transmission resource may be immediately stopped, and the Mode 2 transmission resource may be used until the connection for the request for the radio resource for the D2D communication is successful (or until the Mode 1 transmission resource is allocated).

Furthermore, according to the present embodiment, in the case where the use of the Mode 2 transmission resource is possible with the broadcast information, only when the cause of the establishment of the RRC connection, which is notified by the non-access layer control unit 111 is the emergency call or the priority call, the terminal device 1 may attempt to make a connection for the request for the radio resource for the D2D communication. Alternatively, the configuration of the Mode 2 transmission resource, which can be used in the case where a specific condition is satisfied (which, for example, can be used in the case of the emergency call or the priority call), may be broadcast. With this constitution, the transmission resource can be efficiently allocated to the terminal device 1 that needs to preferentially perform the communication.

Furthermore, according to the present embodiment, the terminal device 1 is described as performing the access control using the Access Class that is retained by the terminal device 1 itself, but no limitation to this is imposed. The access class information that is used at the time of the connection for the request for the radio resource for the device-to-device data communication or the D2D communication may be configured. For example, this configuration may be performed at the stage prior to the shipment of the terminal device 1, and after the shipment, the connection to the authentication apparatus (the authentication server or the like) through the base station apparatus 2 or the like may be made for the configuration. Furthermore, the connection to a small-sized authentication device or the like may be made in a wired or wireless manner for the configuration. With this constitution, because the Access Class when performing normal communication with the base station apparatus 2 and the Access Class when performing the Device-to-device data communication can be configured separately from each other, the flexible access control can be performed.

According to the second embodiment, based on the information relating to the access restriction and the Mode 2 transmission resource information, which are broadcast from the base station apparatus 2, by checking for the access restriction and making a selection of the radio resource to be used, the terminal device 1 can perform the efficient access control.

Third Embodiment

A third embodiment of the present invention will be described below.

According to the first embodiment, the example is described in which, based on the information relating to the access restriction, which is included in the broadcast information and the Access Class that is retained by the terminal device 1, the access restriction at the time of the connection for the request for the radio resource for the D2D communication is performed. According to the present embodiment, an example of processing in a case where the connection by the terminal device 1 is rejected by the base station apparatus 2 at the time of the connection for the request for the radio resource for the D2D communication is described.

The radio resource control unit 110 of the terminal device 1 and the radio resource control unit 210 of the base station apparatus 2 according to the present embodiment operate in a different manner than those of the terminal device 1 and the base station apparatus 2 according to the first embodiment, and detailed description of constituent elements other than these are omitted.

According to the present embodiment, in a case where data that is input from the reception data control unit 104 is an RRC connection rejection message (RRCConnectionReject), with the timer, the radio resource control unit 110 time-tracks the duration that is designed with a timer installation value (waitTime), which is included in the message. At this time, the timer to be used may be a timer that is used in a shared manner in the D2N communication, and may be a timer that is configured independently. Furthermore, in a case where the information on whether or not to use the Mode 2 transmission resource and/or the Mode 2 transmission resource pool information is included in the message, the information may be acquired. At this point, while the timer is running, in a case where whether or not to use the Mode 2 transmission resource is notified based on the information, the transmission data for the device-to-device data communication may be transmitted using the transmission resource in the Mode 2 transmission resource pool. Furthermore, in a case where it is notified that the use of the Mode 2 transmission resource is impossible, while the timer is running, the non-access layer control unit 111 may be notified that the restriction of the device-to-device data communication is in progress.

Furthermore, according to the present embodiment, the radio resource control unit 210 may transmit the information on whether or not to use the Mode 2 transmission resource and/or the Mode 2 transmission resource pool information, in state of being included in the RRC connection rejection message that is transmitted to the terminal device 1 which makes the RRC connection request.

Figure 5:
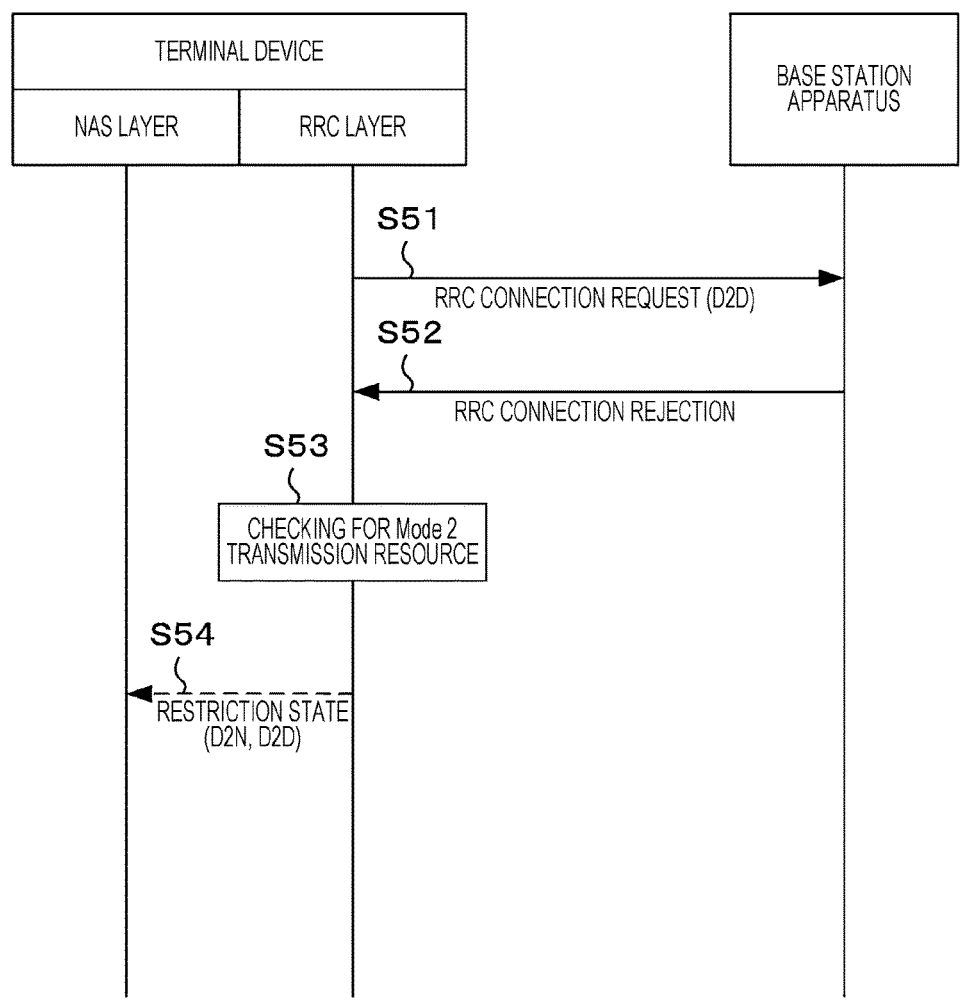
FIG. 5 is a diagram illustrating an example of a sequence chart for access control when requesting a transmission resource that is used in device-to-device data communication according to a third embodiment of the present invention.

Next, according to the present embodiment, an example of the control when the terminal device 1 in the idle state makes a request to the base station apparatus 2 for the transmission resource that is used in the device-to-device data communication is described referring to FIG. 5.

In FIG. 5, the terminal device 1 makes the RRC connection to the base station apparatus 2 (Step S51). At this point, it is desirable that the terminal device 1 here transmits the information that can identify whether the connection request is for the connection for the D2N communication or for the connection for the request for the radio resource for the D2D communication, in a state of being included in the RRC connection request message. Furthermore, before making the RRC connection request, the access control that is performed according to the first embodiment or the second embodiment may be performed.

In a case where the RRC connection is rejected for some reason, the base station apparatus 2 that receives the RRC connection request transmits the RRC connection rejection message to the terminal device 1 (Step S52).

In a case where the information on whether or not to use the Mode 2 transmission resource is included in the message, if the use of the Mode 2 transmission resource is possible, the terminal device 1 that receives the RRC connection rejection message starts the device-to-device data communication that uses the Mode 2 transmission resource, without notifying the higher layer (the non-access layer control unit 111) that the restriction of the device-to-device data communication is in progress (Step S53). Furthermore, if the use of the Mode 2 transmission resource is impossible, the higher layer (the non-access layer control unit 111) is notified that the restriction of the device-to-device data communication is in progress (Step S54).

In Step S53, in a case where the RRC connection is rejected, the timer that counts the time it takes for the access to be available again may be used in a shared manner along with the timer that is used in a case where the RRC connection for the D2N communication is rejected, and be a timer that is configured independently. In a case where the timer that is shared is used, regardless of whether the connection request is for the connection for the D2N communication or for the connection for the request for the radio resource for the D2D communication, the timer that is shared runs, and, based on a state (indicating whether the timer stops, is running, or expires) of the timer and on the information on whether or not to use the notified Mode 2 transmission resource and/or the Mode 2 transmission resource pool information, the selection of the transmission resource that is used in the device-to-device data communication is made. Furthermore, in the case of independent timers, the timer that runs depending on whether the connection request is for the connection for the D2N communication or for the connection for the request for the radio resource for the D2D communication is identified, and, based on the state of the timer that runs in a case where the connection for the request for the radio resource for the D2D communication and on the information on whether or not to use the notified Mode 2 transmission resource and the Mode 2 transmission resource pool information, the selection of the transmission resource that is used in the device-to-device data communication is made.

For example, the timer is running and the information on whether or not to use the Mode 2 transmission resource indicates that the use of the Mode 2 transmission resource is impossible, but in a case where the Mode 2 transmission resource is not configured, the radio resource control unit 110 may notify the higher layer (the non-access layer control unit 111) that the restriction of the device-to-device data communication is in progress.

Alternatively, in a case where the timer is running, where the information on whether or not to use the Mode 2 transmission resource indicates that the use of the Mode 2 transmission resource is possible, and where the Mode 2 transmission resource is configured, the radio resource control unit 110 may perform the device-to-device data communication that uses the Mode 2 transmission resource, at least while the timer is running, without notifying the higher layer (the non-access layer control unit 111) that the restriction of the device-to-device data communication is in progress. At this time, when it comes to the information on whether or not to use the Mode 2 transmission resource, in a case where the Mode 2 transmission resource is configured, the use of the Mode 2 transmission resource may be possible. That is, the information on whether or not to use the Mode 2 transmission resource may be omitted.

With this constitution, based on the information relating to the access restriction and the Mode 2 transmission resource, which are broadcast from the base station apparatus 2, the terminal device 1 can control the state of the restriction or alleviation of the device-to-device data communication. Furthermore, in a case where the timer is configured independently, because the state of the restriction or alleviation of the device-to-device data communication can be controlled independently of the D2N communication, the terminal device 1 can efficiently perform the access control when perform device-to-device data communication.

According to the present embodiment, the base station apparatus 2 may broadcast the configuration of the Mode 2 transmission resource that can be used by the terminal device 1 (that, for example, can be used at the time of access rejection of the connection for the request for the radio resource for the D2D communication) in the case where a specific condition is satisfied. With this constitution, even in a case where the Mode 2 transmission resource that can be used in a normal idle state, which is notified with the broadcast information, is not present, the congestion alleviation is possible by making it possible for the terminal device 1 that is subject to the access restriction to be able to use the Mode 2 transmission resource. Furthermore, in this case, when the duration during which the access is rejection ends, the use of the Mode 2 transmission resource may be immediately stopped, and the Mode 2 transmission resource may be used until the connection for the request for the radio resource for the D2D communication is successful (or until the Mode 1 transmission resource is allocated).

Furthermore, according to the present embodiment, the information on whether or not to use the Mode 2 transmission resource may be broadcast with the broadcast information, not with the RRC connection rejection message. Accordingly, it is possible that overhead on the signaling is reduced.

Furthermore, according to the present embodiment, the example is described in which the information on whether or not to use the Mode 2 transmission resource and/or the Mode 2 transmission resource pool information is included in the RRC connection rejection message, but the information on whether or not to use the Mode 2 transmission resource and/or the Mode 2 transmission resource pool information, which is notified to the terminal device 1 in the connected state, may be transmitted in a state of being included in other than the RRC connection rejection message.

According to a third embodiment, based on the RRC connection rejection message that is notified by the base station apparatus 2, the terminal device 1 performs configuration of the radio resource that is used in the device-to-device data communication, or performs the access restriction, and thus can perform the efficient access control.

According to each embodiment described above, a function of the base station apparatus 2 may be built into a different apparatus. For example, the function may be built into the terminal device 1 that is a master device for the device-to-device data communication, and may be built into a second terminal device 1 that provides information to a first terminal device 1 outside of an area covered by the base station apparatus 2.

Furthermore, according to each embodiment described above, the control of the access to the base station apparatus 2 at the time of the request for the radio resource for the device-to-device data communication is described. However, no limitation to this is imposed and each embodiment described above may be applied to the radio resource request in the Prose Didcovery. In this case, the access control (which uses a shared timer and shared access restriction information) in conformity with the device-to-device data communication and the ProSe Didcovery may be available, and the access control (which uses an individual timer and/or individual access restriction information) in each communication may be available.

Furthermore, according to each embodiment described above, the configuration of the Mode 2 transmission resource that can be used in a case where a specific condition is satisfied is described as being broadcast. However, this may be used in a case where one or several of the multiple Mode 2 transmission resources satisfy a specific condition. The same transmission resource as the Mode 2 transmission resource that is used regardless of whether or not the above-described condition is satisfied may be available.

Moreover, the embodiments described above are only simple examples, and can be realized using various modification examples and substitution examples. For example, it is possible that an uplink transmission scheme is also applied to a communication system in compliance with either a frequency division duplex (FDD) scheme or a time division duplex (TDD) scheme. Furthermore, because the name of each parameter or each event that is described according to the embodiments is given for convenience of description, even if the name that is applied in practice and the name according to the embodiments of the present invention are different from each other, this does not exert any influence on the gist of the invention claimed, in the embodiments of the present invention.

Furthermore, the term "connection" that is used in each embodiment is not limited only to the configuration in which a certain device or apparatus and another certain device or apparatus are connected directly to each other using a physical circuit, and includes the meaning of a configuration in which a connection is made logically or of a configuration in which a wireless connection is made using a wireless technology.

Furthermore, the terminal devices 1 include not only a portable or moving mobile station apparatus, but also a stationary-type electronic apparatus that is installed indoors or outdoors, or a non-moving-type electronic apparatus, for example, an AV apparatus, a kitchen apparatus, a cleaning and washing machine, an air conditioner, office equipment, a vending machine, other household apparatuses or measuring apparatuses, a vehicle-mounted apparatus, and a device that results from building a communication function into a wearable device or a health care device that is capable of be worn on a human body. Furthermore, the terminal device 1 is used not only for human-to-human or human-to-machine communication, but also for a machine-to-machine communication (Machine Type Communication).

The terminal device 1 is also referred to as a user terminal, a mobile station apparatus, a communication terminal, a mobile machine, a terminal, a User Equipment (UE), or a Mobile Station (MS). The base station apparatus 2 is also referred to as a wireless base station apparatus, a base station, a wireless base station, a fixed station, a NodeB (NB), an evolved Node B (eNB), a Base Transceiver Station (BTS), or a Base Station (BS).

Moreover, the base station apparatus 2 is referred to as the NB in UMTS that is stipulated by 3GPP, and as the eNB in EUTRA or Advanced EUTRA. Moreover, the terminal device 1 in UMTS that is stipulated by 3GPP, and, in EUTRA and Advanced EUTRA, is also referred to as the UE.

Furthermore, for convenience of description, the method, the means, and the algorithm step of realizing the functions of, some of the functions, of the units of each of the terminal device 1 and the base station apparatus 2 are described in specific combinations referring to the functional block diagrams, but these can be realized directly by a piece of software, a software module that is implemented by a processor, or combinations of these.

If the method, the means, and the algorithm step are built in hardware, in addition to being constituted as described referring to the block diagrams, the terminal device 1 and the base station apparatus 2 each are constituted from a power supply device or battery that supplies power to the terminal device 1 and the base station apparatus 2, a display device such as a liquid crystal display, a display drive device, a memory, an input and output interface, input and output terminals, a speaker, and other peripheral devices.

If the method, the means, and the algorithm step are built in software, the function can be retained as one or more commands or codes on a computer-readable medium, and can be transmitted. The computer-readable media include both of communication media or computer-recordable media that help to carry a computer program from one place to another place.

Then, one or more commands or codes may be recorded on the computer-readable recording medium, and a computer system may be caused to read and execute the one or more command or codes that are recorded on the recording medium to perform control of the terminal device 1 or the base station apparatus 2. Moreover, the "computer system" here is defined as including an OS and hardware components such as a peripheral device.

The operations that are described according to each embodiment of the present invention may be realized with a program. A program running on the terminal device 1 and the base station apparatus 2 according to each embodiment of the present invention is a program (a program for causing a computer to operate) that controls a CPU and the like in such a manner as to realize the above-described functions of each embodiment according to each embodiment of the present invention. Then, pieces of information that are handled in the apparatus and the device are temporarily stored in a RAM while being processed. Thereafter, the pieces of information are stored in various ROMs or HDDs, and if need arises, is read by the CPU to be modified or written.

Furthermore, in some cases, the functions of the embodiments described above are realized by executing the program, and in addition, the functions of each embodiment of the present invention are realized by performing processing in conjunction with an operating system or other application programs, based on an instruction from the program.

Furthermore, the "computer-readable recording medium" refers to a portable medium, such as a semiconductor medium (for example, a RAM, a nonvolatile memory card, or the like), an optical recording medium (for example, a DVD, an MO, an MD, a CD, a BD, or the like), and a magnetic recording medium (for example, a magnetic tape, a flexible disk, or the like), and a recording device, such as a disk unit that is built into the computer system. Moreover, the "computer-readable recording media" is defined as including a medium that dynamically retains the program for a short period of time, such as a communication line that is available when transmitting the program over a network such as the Internet or over a communication line such as a telephone line, and a medium that retains the program for a fixed period of time, such as a volatile memory within the computer system, which functions as a server or a client in a case where the program is retained dynamically for a short period of time.

Furthermore, the above-described program may be one for realizing some of the above-described functions and additionally may be one that can realize the above-described functions in combination with a program that is already recorded in the computer system.

Furthermore, functional blocks or all features of each of the terminal device 1 and the base station apparatus 2 according to each embodiment described above can be built into or implemented by a general-purpose processor, a digital signal processor (DSP), an application-specific integrated circuit (ASIC) or a general-purpose arbitrary integrated circuit (IC), a field programmable gate-array signal (FPGA) or a different type of programmable logic device, a discrete gate or a transistor logic, a discrete hardware component, or a combination of these.

The general-purpose processor may be a microprocessor, and instead, the processor may be a conventional processor, a controller, a microcontroller, or a state machine. The general-purpose processor or each circuit described above may be constituted as a digital circuit, and may be constituted as an analog circuit.

Furthermore, the processor may be built as a combination of computing devices. For example, the processor may be a DSP and a microprocessor, multiple microprocessors, one or more microprocessors that are connected to a DSP core, or a combination of other such constitutions.

The embodiments of the invention are described in detail above based on the specific examples, but it is apparent that the nature of each of the embodiments of the present invention and the scope of claims are not limited to the specific examples. A change in design and the like that fall within the scope that does not depart from the gist of the invention are also included. That is, the description in the present specification serves the purpose of providing an exemplary description, and does not impose any limitation to each embodiment of the present invention.

Furthermore, various modifications are possible within the scope of the present invention defined by claims, and embodiments that are implemented by suitably combining technical means that are disclosed according to different embodiments also fall within the technical scope of the present invention. Furthermore, a configuration in which a constituent element that achieves the same effect is substituted for the one that is described according to each embodiment described above is also included in the technical scope of the present invention.

[Wrap-Up]

(1) As described above, according to the present invention, the following means are contrived in order to accomplish the above-described object. That is, according to an embodiment of the present invention, there is provided a terminal device that performs data communication with a base station apparatus and device-to-device data communication that is inter-terminal device direct-data communication using a radio resource which is configured by the base station apparatus, the terminal device selecting any one of a device-to-device data communication that uses a transmission resource which is available when a specific condition that is notified or broadcast by the base station apparatus is satisfied, and a procedure for establishment of a radio resource control connection, based on information on whether or not restriction of access to the base station apparatus is in progress.

(2) Furthermore, in the terminal device according to the embodiment of the present invention, the selection is further made based on an access class that is retained by the terminal device, and/or a priority level of data for the device-to-device data communication.

(3) Furthermore, in the terminal device according to the embodiment of the present invention, the specific condition further includes a case where a radio resource control connection request is rejected.

(4) According to another embodiment of the present embodiment, there is provided a base station apparatus that allocates a transmission resource for device-to-device data communication that is inter-terminal device direct-data communication, to a terminal device, the base station apparatus notifying or broadcasting a transmission resource that is available when a specific condition is satisfied, to the terminal device, and causing the terminal device, which performs access restriction, to perform the device-to-device data communication that uses the transmission resource.

(5) Furthermore, according to still another embodiment of the present invention, there is provided a communication system including: a terminal device that performs device-to-device data communication which is inter-terminal device direct-data communication, using a radio resource that is configured by a base station apparatus; and the base station apparatus that allocates a transmission resource for the device-to-device data communication to the terminal device, in which the base station apparatus notifies or broadcasts a transmission resource that is available when a specific condition is satisfied, to the terminal device, in which the terminal device selects which one of a device-to-device data communication and a procedure for establishment of a radio resource control connection to the base station apparatus to perform, based on information on whether or not restriction of access to the base station apparatus is in progress, and in which the device-to-device data communication uses a transmission resource which is available when the specific condition that is notified or broadcast by the base station apparatus is satisfied.

(6) Furthermore, according to still another embodiment of the present invention, there is provided a notification method that is applied to a terminal device which performs device-to-device data communication that is inter-terminal device direct-data communication using a radio resource which is configured by a base station apparatus, the control method comprising at least: a step of selecting which one of a device-to-device data communication and a procedure for establishment of a radio resource control connection to the base station apparatus to perform, based on information on whether or not restriction of access to the base station apparatus is in progress, in which the device-to-device data communication uses a transmission resource which is available when the specific condition that is notified or broadcast by the base station apparatus is satisfied.

(7) Furthermore, the notification method according to the embodiment of the present invention further includes a step of making the selection based on an access class that is retained by the terminal device, and/or a priority level of data for the device-to-device data communication.

(8) According to still another embodiment of the present invention, there is provided an integrated circuit that is built into a terminal device which performs device-to-device data communication that is inter-terminal device direct-data communication using a radio resource which is configured by a base station apparatus, the integrated circuit causing the terminal device to perform: a function of selecting which one of a device-to-device data communication and a procedure for establishment of a radio resource control connection to the base station apparatus to perform, based on information on whether or not restriction of access to the base station apparatus is in progress, in which the device-to-device data communication uses a transmission resource which is available when the specific condition that is notified or broadcast by the base station apparatus is satisfied.

REFERENCE SIGNS LIST

1 TERMINAL DEVICE
2, 2-1, 2-2 BASE STATION APPARATUS
101, 201 RECEPTION UNIT
102, 202 DEMODULATION UNIT
103, 203 DECODING UNIT
104, 204 RECEPTION DATA CONTROL UNIT
105, 205 PHYSICAL LAYER CONTROL UNIT
106, 206 TRANSMISSION DATA CONTROL UNIT
107, 207 CODING UNIT
108, 208 MODULATION UNIT
109, 209 TRANSMISSION UNIT
110, 210 RADIO RESOURCE CONTROL UNIT
111 NON-ACCESS LAYER CONTROL UNIT
211 NETWORK SIGNAL TRANSMISSION AND RECEPTION UNIT

The invention claimed is:

1. A terminal device that performs data communication with a base station apparatus and device-to-device data communication that is inter-terminal device direct-data communication using a radio resource which is configured by the base station apparatus, the terminal device comprising:
control circuitry configured to select one of (i) the device-to-device data communication that uses a transmission resource which is available when a specific condition that is notified or broadcast by the base station apparatus is satisfied, and (ii) a procedure for establishment of a radio resource control connection, based on information on whether or not the establishment of the radio resource control connection is for a request for the radio resource for the device-to-device data communication, wherein
the control circuitry is configured to perform the data communication or the device-to-device data communication based on the selection.

2. The terminal device according to claim 1,
wherein the selection is further based on an access class that is retained by the terminal device, and/or a priority level of data for the device-to-device data communication.

3. The terminal device according to claim 1,
wherein the specific condition further includes a case where a radio resource control connection request is rejected.

4. The terminal device according to claim 1, wherein the control circuitry is configured to select only one of (i) the device-to-device data communication that uses the transmission resource which is available when the specific condition that is notified or broadcast by the base station apparatus is satisfied, and (ii) the procedure for establishment of the radio resource control connection, based on information on whether or not the establishment of the radio resource control connection is for a request for the radio resource for the device-to-device data communication.

5. A base station apparatus that allocates a transmission resource for device-to-device data communication that is inter-terminal device direct-data communication, to a terminal device, the base station apparatus comprising:
   transmission circuitry configured to (i) notify or broadcast information relating to a restriction of access to a serving cell for the request for a radio resource for the device-to-device data communication, and (ii) cause the terminal device, which performs access restriction, to perform the device-to-device data communication that uses the transmission resource.

6. A control method that is applied to a terminal device which performs device-to-device data communication that is inter-terminal device direct-data communication using a radio resource which is configured by a base station apparatus, the control method comprising at least:
   a step of selecting one of (i) the device-to-device data communication and (ii) a procedure for establishment of a radio resource control connection to the base station apparatus to perform, based on information on whether or not the establishment of the radio resource control connection is for a request for the radio resource for the device-to-device data communication, and
   a step of performing the data communication or the device-to-device data communication based on the selection,
      wherein the device-to-device data communication uses a transmission resource which is available when the specific condition that is notified or broadcast by the base station apparatus is satisfied.

7. The control method according to claim 6,
wherein the selection is further based on an access class that is retained by the terminal device, and/or a priority level of data for the device-to-device data communication.

8. The control method according to claim 6, wherein the step of selecting includes selecting only one of (i) the device-to-device data communication and (ii) the procedure for establishment of a radio resource control connection to the base station apparatus to perform, based on information on whether or not the establishment of the radio resource control connection is for a request for the radio resource for the device-to-device data communication.

* * * * *